US012741421B2

(12) United States Patent
Sherehiy et al.

(10) Patent No.: US 12,741,421 B2
(45) Date of Patent: Sep. 22, 2026

(54) ROBOTIC SYSTEMS FOR ADDITIVE MANUFACTURING

(71) Applicant: University of Louisville Research Foundation, Inc., Louisville, KY (US)

(72) Inventors: Andriy Sherehiy, Louisville, KY (US); Dan O. Popa, Louisville, KY (US); Danming Wei, Prospect, KY (US); Andrew Scott Nimon, Louisville, KY (US); Moath Hasan Alqatamin, Louisville, KY (US); Alireza Tofangchi, Louisville, KY (US); Keng Hsu, Louisville, KY (US); Kevin Walsh, Louisville, KY (US); Cindy Harnett, Louisville, KY (US); Thad Druffel, Louisville, KY (US); Dilan Ratnayake, Louisville, KY (US); Alexander Curry, Finchville, KY (US); Sushmita Challa, Evans, GA (US); Amir Hossein Ghahremani, Toledo, OH (US); Doug Jackson, New Albany, IN (US); Ruoshi Zhang, Louisville, KY (US); Antoine Blasiak, Paris (FR); M. Hossein Saadatzi, Columbus, OH (US); Garrett McGrady, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 587 days.

(21) Appl. No.: 17/845,526

(22) Filed: Jun. 21, 2022

(65) Prior Publication Data

US 2023/0211558 A1 Jul. 6, 2023

Related U.S. Application Data

(60) Provisional application No. 63/213,002, filed on Jun. 21, 2021.

(51) Int. Cl.
*B29C 64/379* (2017.01)
*B25J 9/02* (2006.01)
(Continued)

(52) U.S. Cl.
CPC .......... *B29C 64/379* (2017.08); *B29C 64/112* (2017.08); *B29C 64/171* (2017.08);
(Continued)

(58) Field of Classification Search
CPC ... B29C 64/112; B29C 64/171; B29C 64/236; B29C 64/264; B29C 64/227;
(Continued)

(56) References Cited

U.S. PATENT DOCUMENTS 5,848,458 A * 12/1998 Bullen .................. B23P 21/004 29/33 K
8,210,418 B1 * 7/2012 Landoll .............. B23K 37/0452 228/43

(Continued)

OTHER PUBLICATIONS

Challa et al., "Functional Fiber Junctions for Circuit Routing in E-Textiles: Deterministic Alignment of MEMS Layout with Fabric Structure", Proceedings of the ASME 2021 16th International Manufacturing Science and Engineering Confeence MSEC2021, 2021, 9 pages.

(Continued)

*Primary Examiner* — Nahida Sultana
(74) *Attorney, Agent, or Firm* — Hamilton, Brook, Smith & Reynolds, P.C.

(57) ABSTRACT

Systems and methods for additive manufacturing. In some examples, a system includes a frame defining an interior volume and an overhead robotic arm suspended from a gantry on a ceiling of the frame. The system includes manufacturing subsystems located within the interior volume of the frame. The system includes a control system
(Continued)

configured for controlling the overhead robotic arm for parts movement among additive manufacturing processes using the manufacturing subsystems. The manufacturing subsystems can include one or more of: a microassembly station, an aerosol jetting print station, an intense pulsed light (IPL) photonic sintering station, a fiber weaving station, and a 3D printing station.

16 Claims, 29 Drawing Sheets

(51) Int. Cl.

*B29C 64/112* (2017.01)
*B29C 64/171* (2017.01)
*B29C 64/209* (2017.01)
*B29C 64/236* (2017.01)
*B29C 64/264* (2017.01)
*B29L 31/34* (2006.01)
*B33Y 30/00* (2015.01)
*B33Y 40/00* (2020.01)
*B33Y 80/00* (2015.01)

(52) U.S. Cl.

CPC .......... *B29C 64/209* (2017.08); *B29C 64/236* (2017.08); *B29C 64/264* (2017.08); *B33Y 30/00* (2014.12); *B33Y 40/00* (2014.12); *B25J 9/026* (2013.01); *B29L 2031/3425* (2013.01); *B33Y 80/00* (2014.12)

(58) Field of Classification Search

CPC ...... B29C 64/378; B29C 64/393; B25J 9/026; B25J 15/04; B25J 15/0491

See application file for complete search history.

(56) References Cited

U.S. PATENT DOCUMENTS 10,906,188 B1 * 2/2021 Sun ........................ B25J 9/1689
2006/0160250 A1 * 7/2006 Bonassar ................ B22F 12/50 438/1
2010/0126297 A1 * 5/2010 Popa .......................... B25J 7/00 74/490.04
2013/0089642 A1 * 4/2013 Lipson ................... B33Y 10/00 426/115
2014/0252668 A1 * 9/2014 Austin ...................... B28B 3/20 425/375
2015/0314890 A1 * 11/2015 DesJardien ............ B25J 11/007 212/324
2018/0370122 A1 * 12/2018 Maccormack ........ B29C 64/209
2020/0368970 A1 * 11/2020 Georgeson ............. B33Y 10/00
2021/0001475 A1 * 1/2021 Miller ........................ B25J 5/02
2021/0316450 A1 * 10/2021 Torabi .................... B25J 9/0081
2022/0001613 A1 * 1/2022 Chapman .............. B29C 64/232
2022/0143911 A1 * 5/2022 Zhou ...................... B25J 9/0084
2022/0258418 A1 * 8/2022 Sinder ................... B29C 64/182

OTHER PUBLICATIONS

Ferris et al., "Characterizing The Conductivity Of Aerosol Jet Printed Silver Traces on Glass Intense Pulsed Light (IPL)". Proceedings of the ASME 2021 17th International Manufacturing Science and Engineering Conference, MSEC2022, 2022, 8 pages.

Ghahremani, et al., "Automated Fabrication of Perovskite Photovoltaics Using Inkjet Printing and Intense Pulse Light Annealing", Energy Technol., vol. 9, 2021, pp. 1-10.

Morice et al., "Characterization of the Direct Write Inkjet Printing Process for Automated Fabrication of Pedot: PSS thin Films". Proceedings of the ASME 2021 17th International Manufacturing Science and Engineering Conference MSEC2022, 2022, pp. 1-9.

Nimon et al., "Precision Evaluation Of Large Payload Scara Robot For PCB Assembly". ASME 2022 MSEC Manufacturing Science & Engineering Conference (MSEC), 2022, 8 pages.

Olowo et al., "Aerosol Jet Printed Tactile Sensor on Flexible Substrate". IEEE International Conference on Flexible and Printable Sensors and Systems (FLEPS), 2022, 4 pages.

Olowo et al., "Inkjet Printing Of PEDOT:PSS Inks for Robotic Skin Sensors". Proceedings of the ASME 202 2 1 7 th International Manufacturing Science and Engineering Conference MSEC2022, 2022, pp. 1-8.

Olowo et al., "PEDOT: PSS polymer Aerosol Jet-printing for Robotic Skin Sensors". IEEE International Conference on Flexible and Printable Sensors and Systems (FLEPS), 2022, 4 pages.

Wei et al., "Automated Fabrication of Tactile Sensors Using a Custom Additive Manufacturing Platform", IEEE International Conference on Manipulation, Automation and Robotics at Small Scales (MARSS), 2022, 6 pages.

Wei et al., "Precise and Effective Robotic Tool Change Strategy Using Visual Servoing with RGB-D Camera", Proceedings of the ASME 2021 International Design Engineering Technical Conferences and Computers and Information in Engineering Conference IDETC-CIE2021, 2021, 6 pages.

Wei et al., "Precision Evaluation of Nexus, a Custom Multi-Robot System for Microsystem Integration.", Proceedings of the ASME 2021 16th International Manufacturing Science and Engineering Conference MSEC2021, 2021, pp. 1-11.

* cited by examiner

| # R | Val | Package | PosX | PosY | Rot |
|---|---|---|---|---|---|
| C1 | 22pF | C0805 | 9.5 | 21.5 | 180 |
| C2 | .01uF | C0805 | 28 | 37.75 | 90 |
| C3 | 22pF | C0805 | 9.5 | 17.5 | 180 |
| C4 | 0.1uF | C0805 | 19.5 | 26.5 | 270 |
| C5 | 10nF | C0805 | 34.5 | 5 | 90 |
| C6 | 10uF | C0805 | 31 | 5 | 90 |

ROBOTIC SYSTEMS FOR ADDITIVE MANUFACTURING

CROSS REFERENCE TO RELATED APPLICATION

This application claims the benefit of U.S. Provisional Patent Application Ser. No. 63/213,002, filed Jun. 21, 2021, the disclosure of which is incorporated herein by reference in its entirety.

GOVERNMENT INTEREST

This invention was made with government support under contract number 1828355 and contract number 2025075 awarded by the National Science Foundation. The government has certain rights in the invention.

BACKGROUND

The subject matter described in this specification relates generally to robotic manufacturing systems and in particular to robotic platforms for multiscale integration of miniature devices and systems, such as wearable MEMS sensor fabrics, microrobots for wafer scale microfactories, tactile robot skins, next generation energy storage, solar cells, and biosensors.

Industrial robots, as mature and high-efficient equipment, have been applied to various fields, such as vehicle manufacturing, product packaging, painting, welding, and medical surgery. Most industrial robots are only operating in their own workspace, in other words, they are floor-mounted at the fixed locations. Some industrial robots are wall-mounted on one linear rail based on the applications. Sometimes, industrial robots are ceiling-mounted on an X-Y gantry to perform upside-down manipulation tasks.

SUMMARY

This specification describes the NeXus, a custom robotic system that has been designed for precision microsystem integration tasks with a ceiling-mounted gantry. The system tasks include, for example, assembly, bonding, and 3D printing of sensor arrays, solar cells, and microrobotic prototypes. The NeXus includes a frame, providing structural rigidity, a large overhead X-Y gantry carrying a 6 degrees of freedom industrial robot, and several other precision positioners and processes. Results of an evaluation verify that the performance objectives of the design are achieved.

The control systems and computer systems described herein may be implemented in hardware, software, firmware, or any combination thereof. In some implementations, the subject matter described herein may be implemented using a computer readable medium having stored thereon computer executable instructions that when executed by the processor of a computer control the computer to perform steps. Example computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DESCRIPTION

This specification describes the methods and systems for multiscale additive manufacturing. The methods and systems are described with respect to an example robotic platform, the NeXus.

The NeXus is a robotic platform for multiscale integration of miniature devices and systems, such as wearable MEMS sensor fabrics, microrobots for wafer scale microfactories, tactile robot skins, next generation energy storage, solar cells, and biosensors. This instrument has flexibility to fixture, position, transport and assemble components across a wide-spectrum of length scales (100 nm to 1 m) and provides unparalleled additive process capabilities such as 3D printing through both aerosol jetting and ultrasonic bonding and forming, thin film photonic sintering, fiber loom weaving and in-situ MEMS packaging and interconnect formation.

In some examples, the system has a footprint of around 3 m×3 m×2 m (X, Y, Z) and includes multiple robots, precision positioners, multiple manipulation tools, and additive process and packaging capabilities. Several sub-systems including processes, robots, and metrology tools are integrated into the NeXus, and several microsystem demonstrators can be included in the system, for example:

1) Optomec Decathlon Aerosol InkJet printer—an additive manufacturing station for depositing multi-material features (lines) 20 micron wide, and under micron thick. The demonstrators include: pressure sensitive robot skins on flexible substrates, and electronic PCBs.

2) A custom ultrasonic print head configured for metal interconnect formation for wire bonding. The demonstrator for our custom ultrasonic end-effector include microrobots and a soft PVDF actuator surface.

3) A custom Microassembly Station for microrobotic demonstrators (MAS). The microrobotic demonstrators include: SolarPede, a mobile cm-size micro crawler.

4) An intense pulsed light sintering station (IPL) using a Xenon corporation lamp, used to cure thin and thick films deposited with the Optomec. The demonstrator for IPL include: a perovskite solar cell.

5) An additive 3D printing head including a dual head fused filament (FDM).

6) A fiber loom station (FLS), used to create electronic textiles for wearable devices. The demonstrator for FLS include: a functionalized fiber network.

7) Various end-effector process tools, including micro-grippers, dispensers, probers and laser cutting/curing tools. Various metrology and test tools including microscope station.

8) Various robotic positioning tools including robots, a custom 6 DOF positioner, custom fixtures, and a Nexus system control software.

Figure 1:
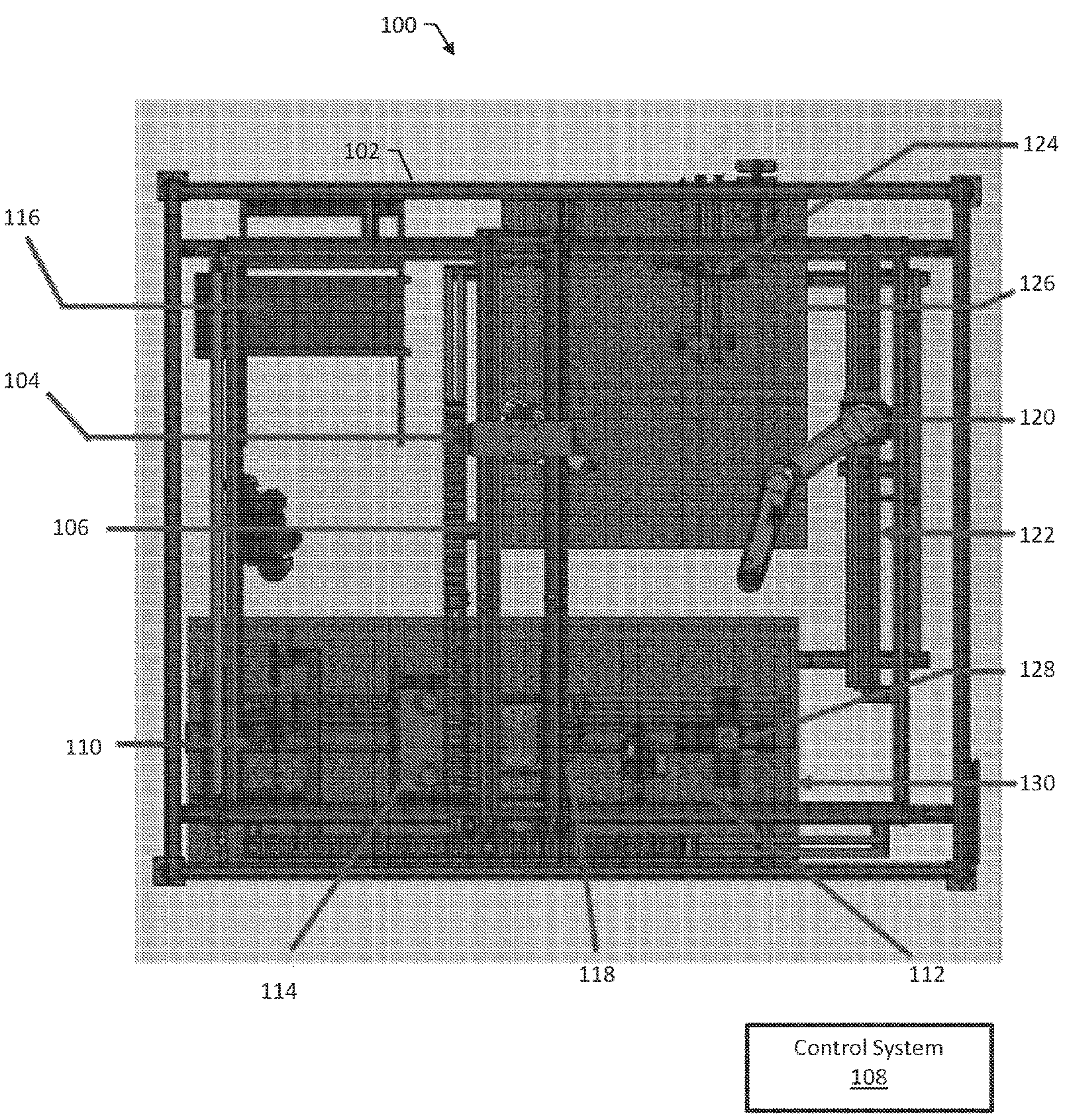
FIG. 1 is a diagram illustrating an example robotic system for additive manufacturing.

FIG. 1 is a diagram illustrating an example robotic system 100 for additive manufacturing. FIG. 1 is an overhead view of the system 100.

The system 100 includes a frame 102 defining an interior volume and an overhead robotic arm 104 suspended from a gantry 106 on a ceiling of the frame 102. The system 100 includes manufacturing subsystems located within the interior volume of the frame 102. The system 100 includes a control system 108, e.g., a system of one or more computers, configured for controlling the overhead robotic arm 104 for parts movement among additive manufacturing processes using the manufacturing subsystems.

In some examples, the manufacturing subsystems include one or more of: a microassembly station 110, an aerosol jetting print station 112, an intense pulsed light (IPL) photonic sintering station 114, a fiber weaving station 116, and a 3D printing station 118. In general, the manufacturing subsystems can include any appropriate type of subsystems for additive manufacturing.

In some examples, the overhead robotic arm 104 is a 6-degree-of-freedom (6-DOF) robotic arm. The system 100 can include an additional robotic arm 120 for pick and place of robotic components. The additional robotic arm 120 can be, e.g., a 4-degree-of-freedom (4-DOF) robotic arm. The additional robotic arm 120 can be configured for pick and place of electronic components for printed circuit board (PCB) applications and positioning tools in conjunction with textile weaving. The system 100 can include a robotic transport unit (RTU) 122 configured for moving the additional robotic arm 120.

In some examples, the gantry 106 on the ceiling of the frame is an X-Y gantry and the control system 108 is configured for controlling the gantry to move the overhead robotic arm 104. The X-Y gantry can have a travel range of, for example, at least 2800 mm by 2250 mm, inclusive. This travel range can be useful, for example, where the frame 102 has outer dimensions of at least 3960 mm by 3530 mm by 2215 mm (length by width by height) and the frame is configured (e.g., by virtue of appropriate materials selection and fasteners) to carry at least a 250 kg payload The system 100 can include a tool change station 124 and an optical table 126 (e.g., 1.8 m by 1.5 m). In some examples, the aerosol station 112 is adjacent to a 6DOF positioner 128 and another optical table 130 (e.g., 3 m by 1.2 m).

The control system 108 can be programmed to carry various additive manufacturing processes. For example, the control system 108 can be configured for automated fabrication of perovskite photovoltaics using the overhead robotic arm, automated fabrication of perovskite photovoltaics using inkjet printing and intense pulse light annealing, and/or automated fabrication of device-on-fiber microelectromechanical systems (MEMS).

The control system 108 can be programmed for automated additive manufacturing, and in some cases, the control system 108 can include a graphical user interface (GUI) for receiving manufacturing parameters and/or control instructions. With appropriate control programs, the system 100 can be configured to realize one or more of the following advantages:

- Integration of additive manufacturing and robotic tools enabling automation of the material handling,
- Full automation of the additive manufacturing processes enabling better control, reliability, and efficiency,
- Integration of different additive manufacturing technologies in one location enabling its application within one fabrication process,
- UI enables flexibility with respect to the planning and design of the manufacturing processes and furthermore provides a platform (e.g. in the control system 108) for the implementation of the automation tool, such as machine learning and neural networks.

Figure 2A:
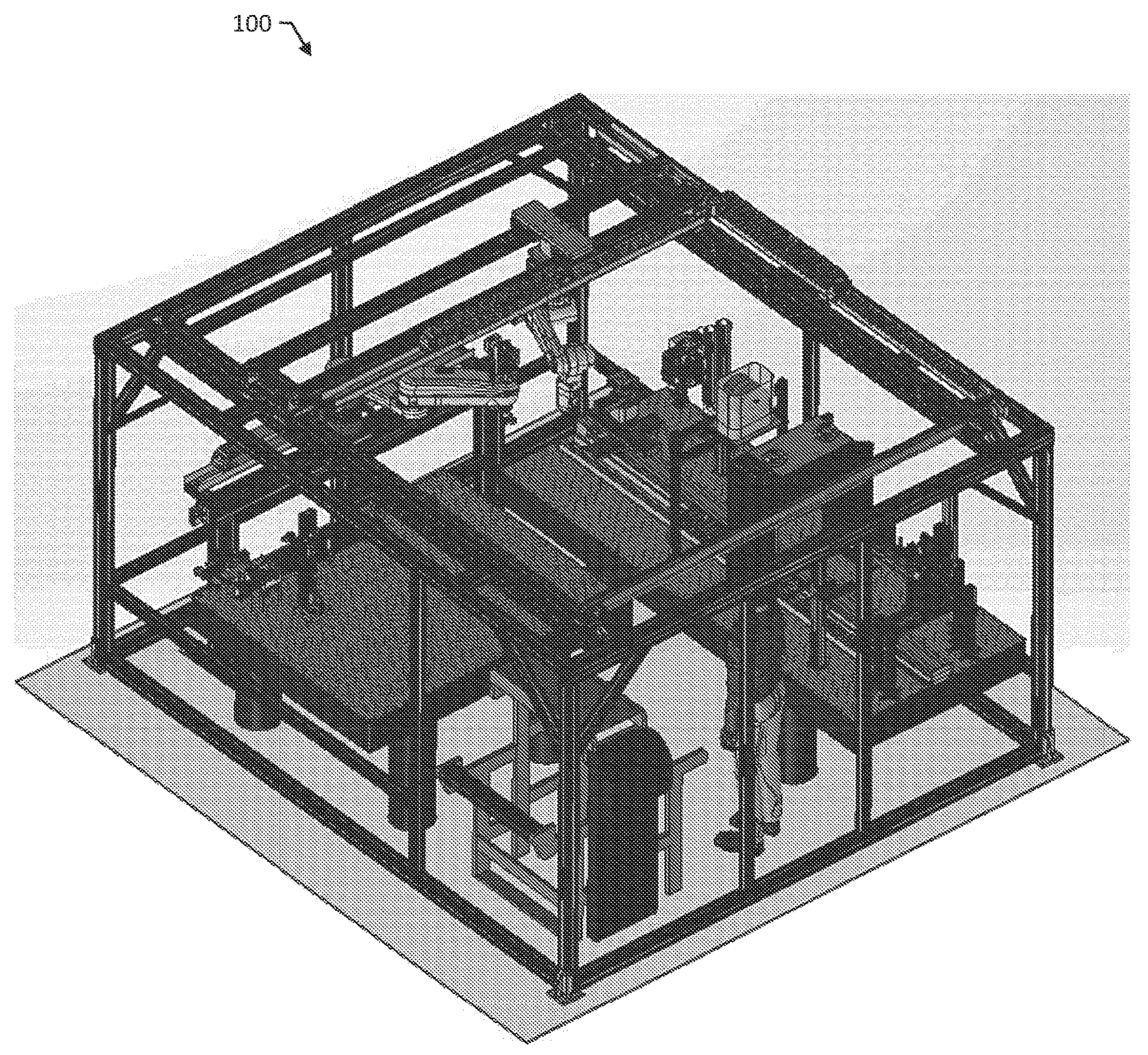
FIG. 2A shows an isometric view of the system.
Figure 2B:
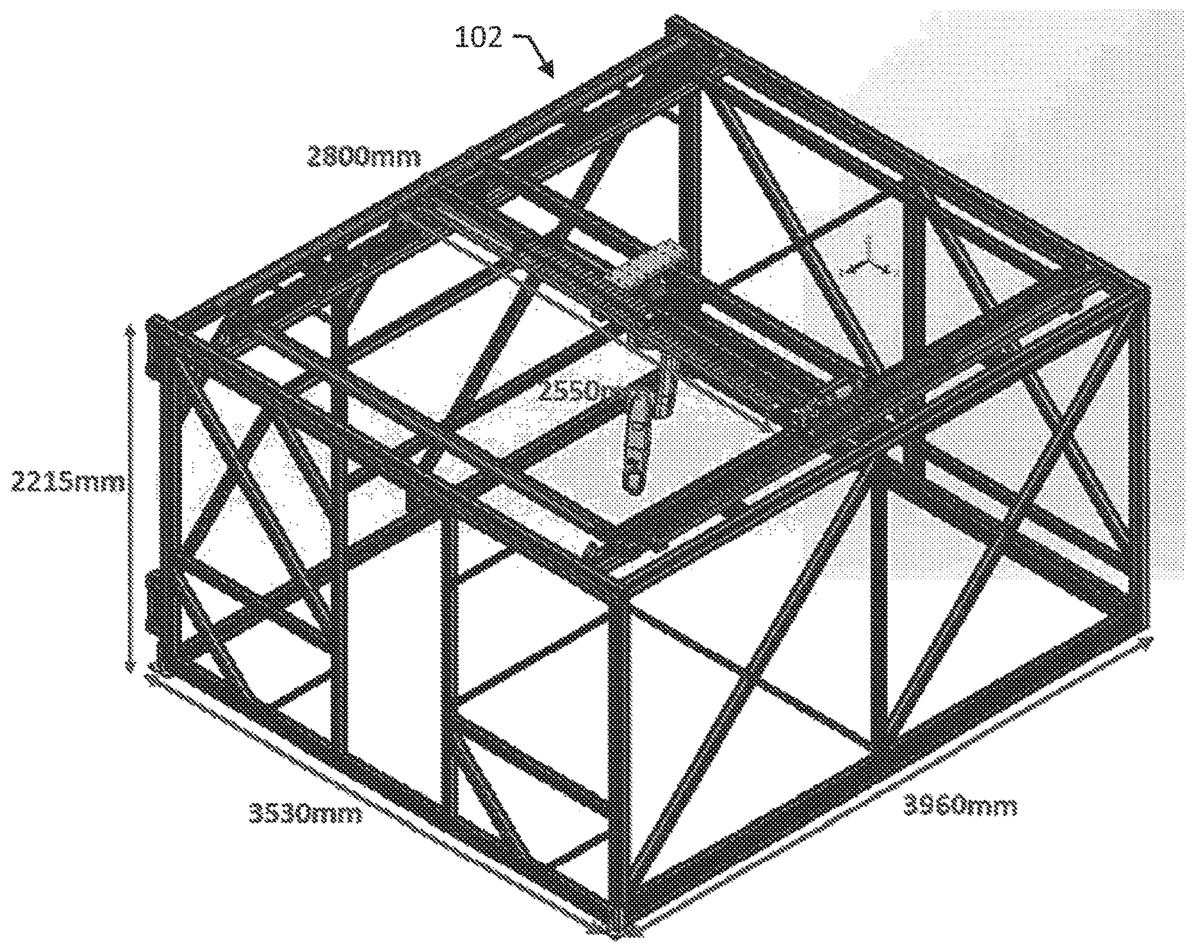
FIG. 2B shows an isometric view of the frame and provides examples of suitable dimensions for the frame.

FIG. 2A shows an isometric view of the system 100. FIG. 2B shows an isometric view of the frame 102 and provides examples of suitable dimensions for the frame 102.

The frame 102 can be configured to carry more than 250 kg payload, which includes the X-Y gantry and robotic arm. The ceiling-mounted industrial robotic arm can operate with accuracy and repeatability under 50 μm existing the uncertainties of custom frame, X-Y gantry, and corresponding adapters. The workspace of the robotic arm along with the X-Y gantry can reach, for example, approximately 3.5 m×3.5 m×1 m.

The frame 102, which can be viewed as a multi-member mechanical structure, exhibits various natural frequencies with corresponding modal shapes (eigenvalues). The modal frequencies and mode shapes as well as deformation under a static load can be simulated using a computer system, e.g., by executing a Finite Element Analysis (FEA) simulation, for example, COMSOL®. The amplitude of each vibrational mode depends on the external moving objects attached to the frame, such as the gantry's body and the robotic arm.

By increasing the stiffness of the structure, the natural frequency also tends to increase which is favorable. The attachment of additional beams to the structure would increase the bulk stiffness of the frame. FEA software can be used to visualize the progressive improvement that emerged in the frame quantitatively and to optimize the final arrangement of the beams in the frame.

Figure 3A:
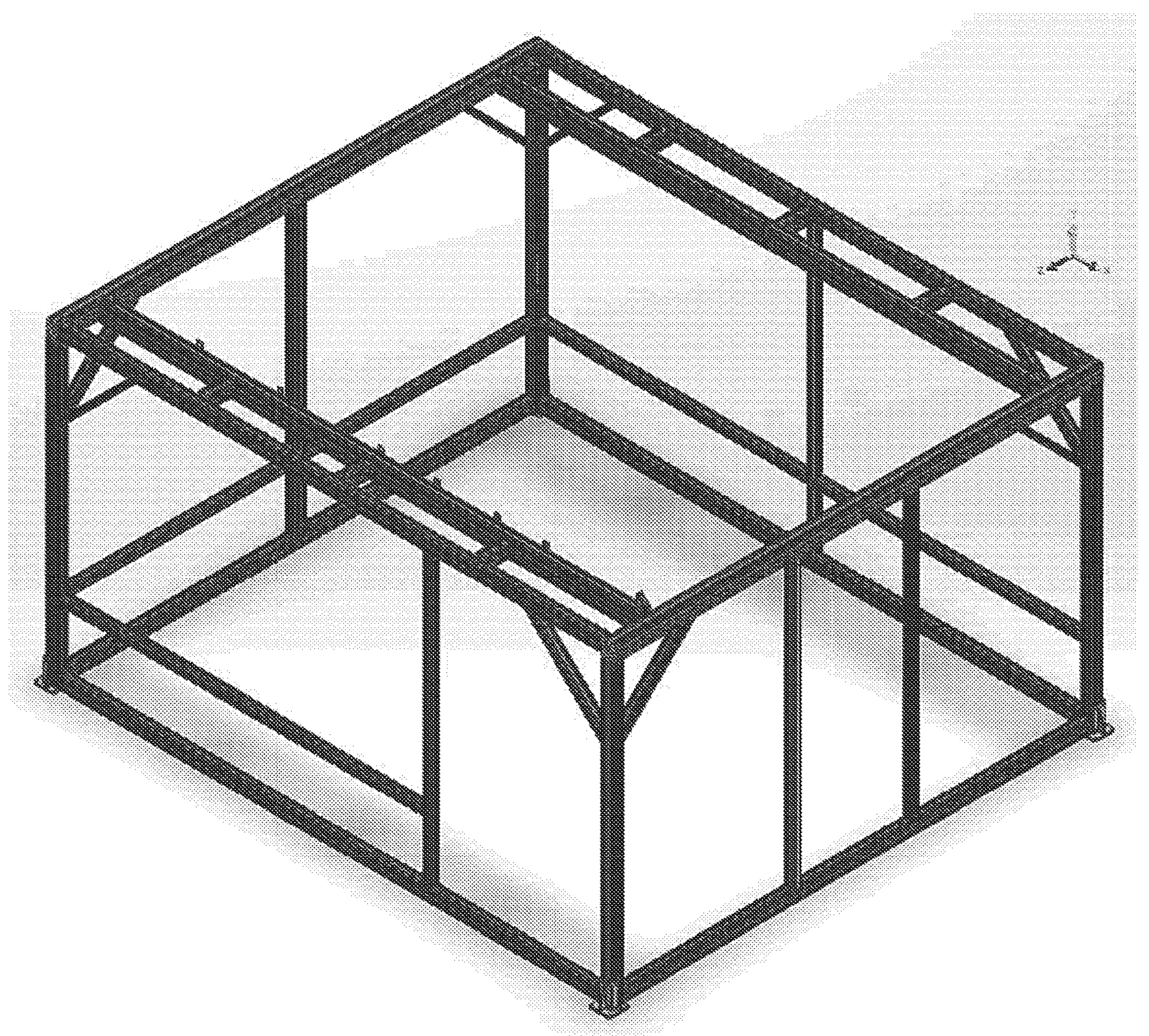
FIG. 3A shows an isometric view of an example initial design of the frame.
Figure 3B:
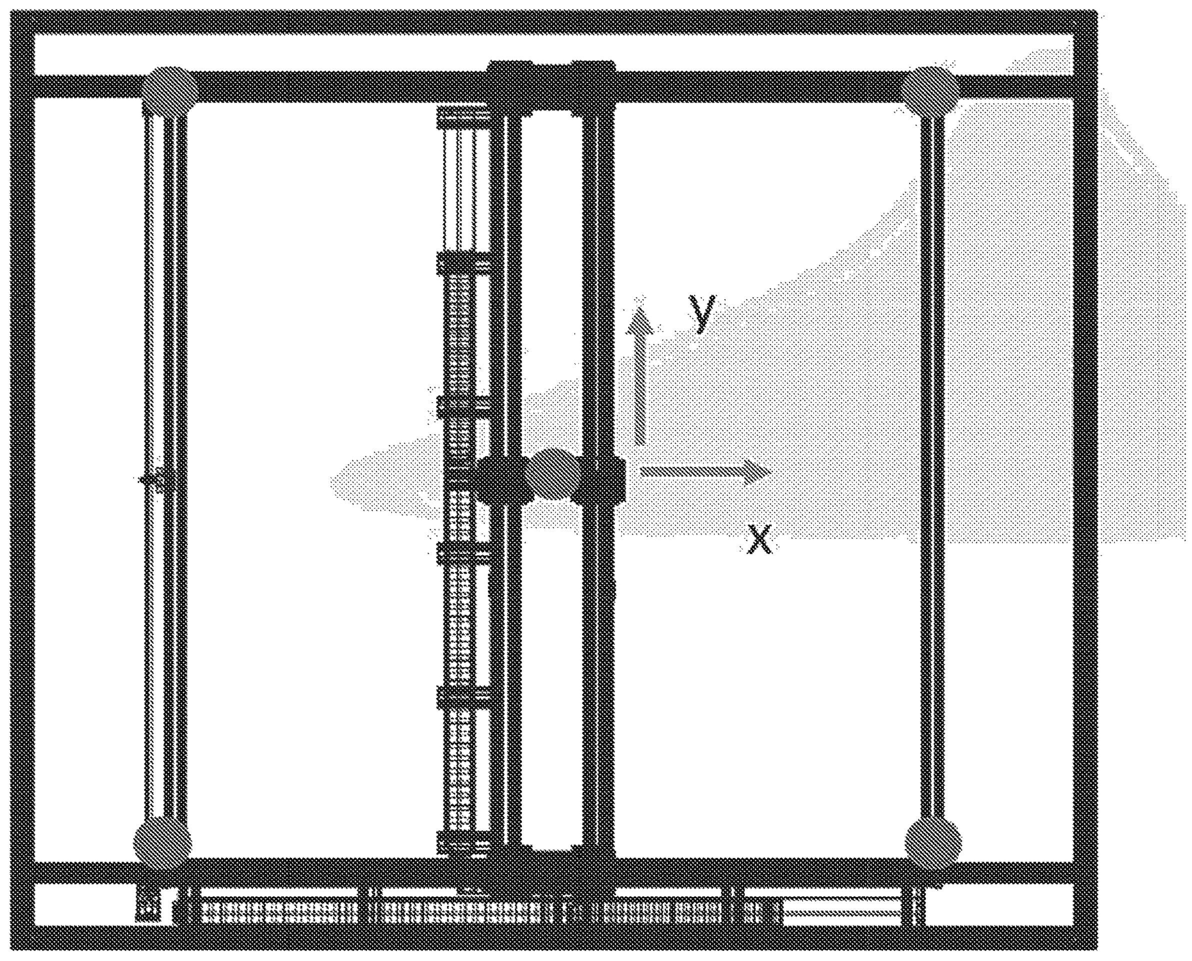
FIG. 3B shows locations of lumped mass on the gantry.

FIG. 3A shows an isometric view of an example initial design of the frame 102. FIG. 3B shows locations of lumped mass on the gantry. In the example shown in FIGS. 3A-3B, the design is dimensionally and structurally sound. FEA software can used to determine vibration amplitudes and carry out progressive modifications to the frame 102 for particular applications of additive manufacturing processes.

The accelerated motions of the robotic arm and the gantry can be included in the FEA simulation to calculate the effective forces acting on the frame 102. The load sign can vary as the robotic arm and gantry move in various directions. For structural optimization, progressive modifications can be made to the frame to improve its stability and mitigate vibrational amplitude during robot translation.

In some examples, the frame 102 can be configured by initially fixing the frame 102 on the ground on its four corners with no additional buttress and interior beams, which suffered from shaking and observable deformation. The frame 102 can then be modified to have lower beams anchored to the ground at 8 points, which can result in diminished vibrations on the base beams but not on the entire frame. The frame 102 can then be modified to include small diagonal beams attached at each corner, which can result in a reduction in frame vibrations in all directions. In some examples, a reinforced pillar can be included in the frame. The frame 102 can be modified to include longer diagonal beams for further vibrational mitigations and structural deformation.

Figure 4:
FIG. 4 is a diagram of an example subsystem that can be configured to locate and change tools automatically using a depth camera.

FIG. 4 is a diagram of an example subsystem 400 that can be configured to locate and change tools automatically using a depth camera. Different tools can be used by the robotic arm 104 to position, e.g., grippers, printers, and other types of end-effectors in the workspace. To improve the precision and cycle-time of a robotic tool change, the system 100 can use a depth camera, e.g., an RGB-D camera, and use visual servoing to automate the tool change process, which can improve tool location time compared to manually changing the tool by expert human operators.

The subsystem 400 shown in FIG. 4 includes the X-Y gantry 106, the robotic arm 104, a depth camera 402, a master side 404 of a tool changer, a mounting module 406, a tool side 408 of a tool changer, and an electrical gripper 410 as an example end-effector. The tool changer can be, e.g., an ATI QC-11 tool changer. The automated tool change can be performed, for example, by the control system 108 of FIG. 1.

In the automated mode, an initial position was defined to acquire an image of the QC-11 tool side. The distance between the depth camera and surface of the QC-11 tool side was not defined at the beginning of the tool-change sequence. For some types of depth cameras, when the distance between the camera and object is less than 28 cm, low-resolution depth values will be acquired. In other words, the distance between the camera and target should not be less than 28 cm.

Prior to the automated sequence, an image of the QC-11 tool side target was taken at a distance of 30 cm from the camera and used as a matching template for the visual servoing process. During the visual servoing process, the origin of the template will be moved to the desired position with the desired orientation. After the visual servoing process, the origin of the QC-11 master side (Pt) will transform to the position of the origin of the camera (Pc) by homogenous transformation motion.

Figure 5:
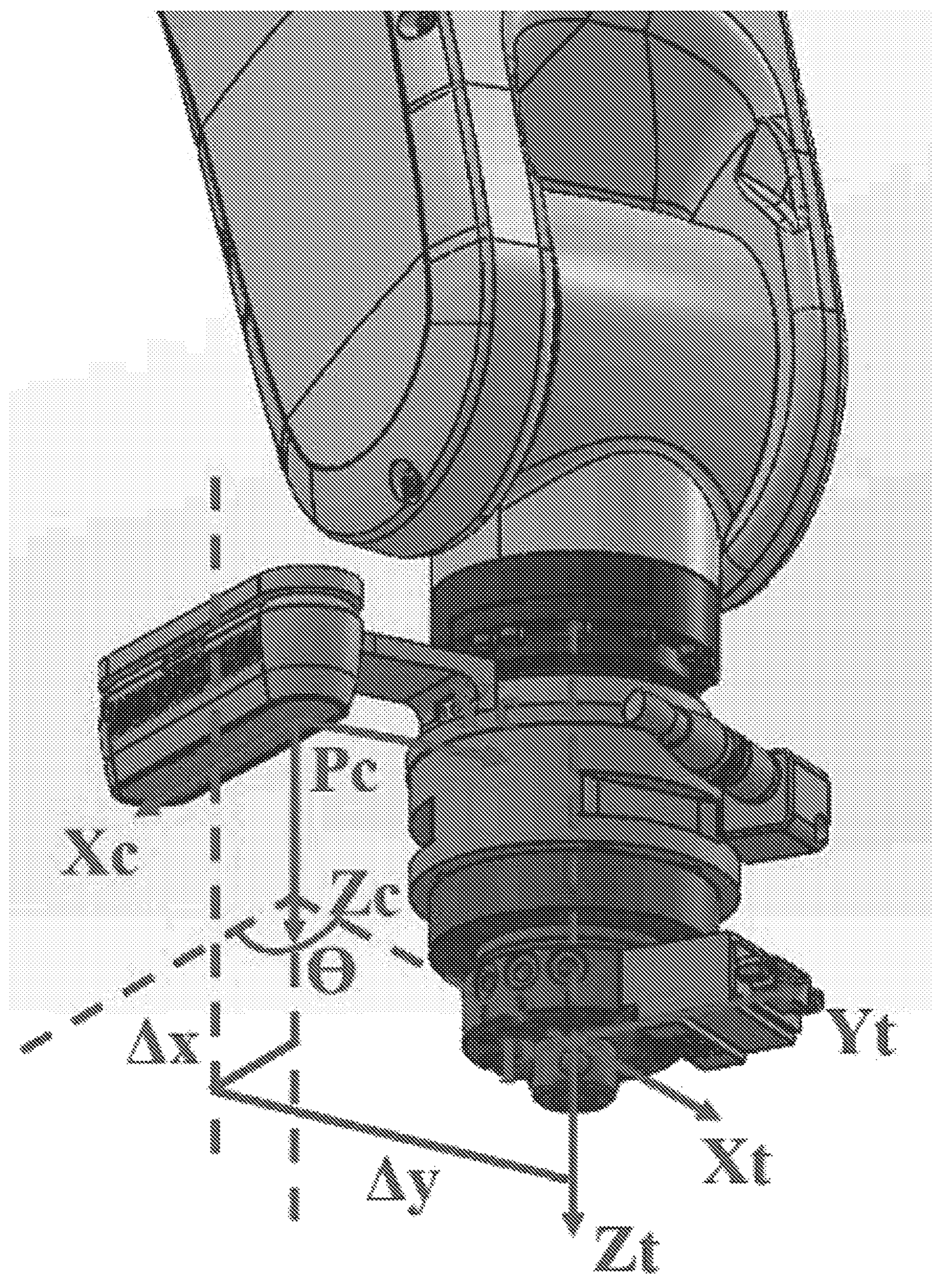
FIG. 5 shows the coordinate systems of the camera and the master side of the tool changer.

FIG. 5 shows the coordinate systems of the camera and the master side of the tool changer. Note that there is no motion in Z-axis during this adjustment. The transformation matrix includes a 2D rotation matrix and a translation matrix employed as equations below:

$$R_z = \begin{bmatrix} \cos\theta & -\sin\theta & 0 \\ \sin\theta & \cos\theta & 0 \\ 0 & 0 & 1 \end{bmatrix}$$

$$T = \begin{bmatrix} 1 & 0 & \Delta x \\ 0 & 1 & \Delta y \\ 0 & 0 & 1 \end{bmatrix}$$

$$P_c = R_z T P_t$$

$$\begin{bmatrix} X_c \\ Y_c \\ 1 \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} 1 & 0 & \Delta x \\ 0 & 1 & \Delta y \\ 0 & 0 & 1 \end{bmatrix} \begin{bmatrix} X_t \\ Y_t \\ 1 \end{bmatrix}$$

where $R_z$ is rotation matrix around the Z-axis, T is the translation matrix, θ is the angle between $X_c$ axis and $X_t$ axis. Δx and Δy are the offsets between $P_c$ and $P_t$ in $X_c$ and $Y_c$ axis, respectively, as depicted in FIG. 5.

After homogenous transformation, the origin of the QC-11 master side was moved to the origin of the depth camera matching its coordinate system. Currently, the QC-11 master side and tool side should be aligned properly with a certain distance. Next step, the robotic arm moved down to make the tool change components coupling, the distance to move down was calculated by measured depth between the camera and surface of QC-11 tool side and the difference between $P_c$ and $P_t$ in Z-axis. Then an internal solenoid valve of the robotic arm was triggered to transfer the compressed air to lock the tool change coupler. According to the QC-11 tool changer mechanism, locking and unlocking the QC-11 master side and tool side can be used pneumatics. After the tool was coupled on the end-effector of the robotic arm, the QC-11 tool side was slid out from the mounting module on the tool change station. The robotic arm moved out in a straight distance and moved back to slide the QC-11 tool side in back to the mounting module. Then, after using compressed air to unlock the tool change components, the robotic arm moved up to release the tool.

Figure 6:
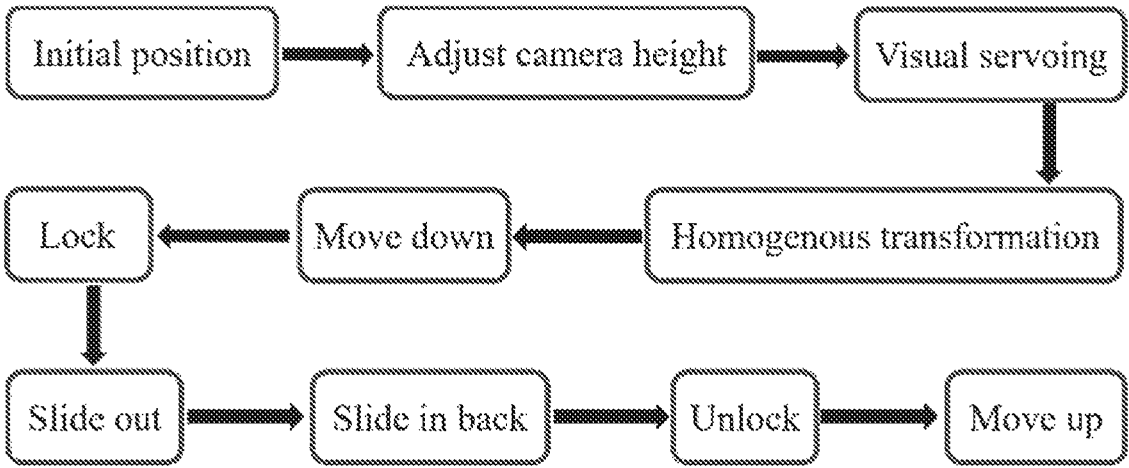
FIG. 6 is a flow diagram illustrating the sequence of the automated tool change process.

FIG. 6 is a flow diagram illustrating the sequence of the automated tool change process. Visual servoing applied into automated mode can enhance the accuracy to locate the position of the QC-11 tool side. With visual feedback, the image Jacobian was employed to adjust the robotic arm motion reaching the desired position and orientation based on the image information of the template. The differences of the origin of template in pixel have the relationship with image Jacobian and differences of robotic arm motions shown in Equation 5. Furthermore, the image Jacobian is a 3×3 matrix expressed as below:

$$\begin{bmatrix} \Delta P_x \\ \Delta P_y \\ \Delta P_\theta \end{bmatrix} = J_{image} \begin{bmatrix} \Delta X \\ \Delta Y \\ \Delta\theta \end{bmatrix}$$

$$J_{image} = \begin{bmatrix} J_{11} & J_{12} & J_{13} \\ J_{21} & J_{22} & J_{23} \\ J_{31} & J_{32} & J_{33} \end{bmatrix}$$

where $\Delta X$, $\Delta Y$, and $\Delta\theta$ are the variations of the robotic motion in a plane; $\Delta P_x$, $\Delta P_y$, and $\Delta P_\theta$ are variable pixel values of the origin of the template in the field of view of the depth camera. The nine entries of the image Jacobian can be calculated by a set of at least 3 features with known motions of the robotic arm. An image Jacobian generator program can be used to generate a specific image Jacobian value for a specific magnification of the depth camera with a specific depth between the camera and the surface of the target.

After the image Jacobian was defined, the origin of the template motions to the desired position with the desired orientation can be achieved by the following equation:

where $X_{cur}$, $Y_{cur}$, $\theta_{cur}$, $X_{new}$ and $Y_{new}$, and $\theta_{new}$ are the current and new configuration of robotic arm; $P_{X_d}$, $P_{Y_d}$, $P_{\theta_d}$, $P_{X_{cur}}$, $P_{Y_{cur}}$, and $P_{\theta_{cur}}$ are pixel values of the desired and current configuration of the origin of the template in the depth camera image. $\Delta s$ is the step size of the movement of the robotic arm. Based on the vision feedback values, the robotic arm can move to the desired position and orientation in a fast and precise method by using the visual servoing technique.

Figure 7A:
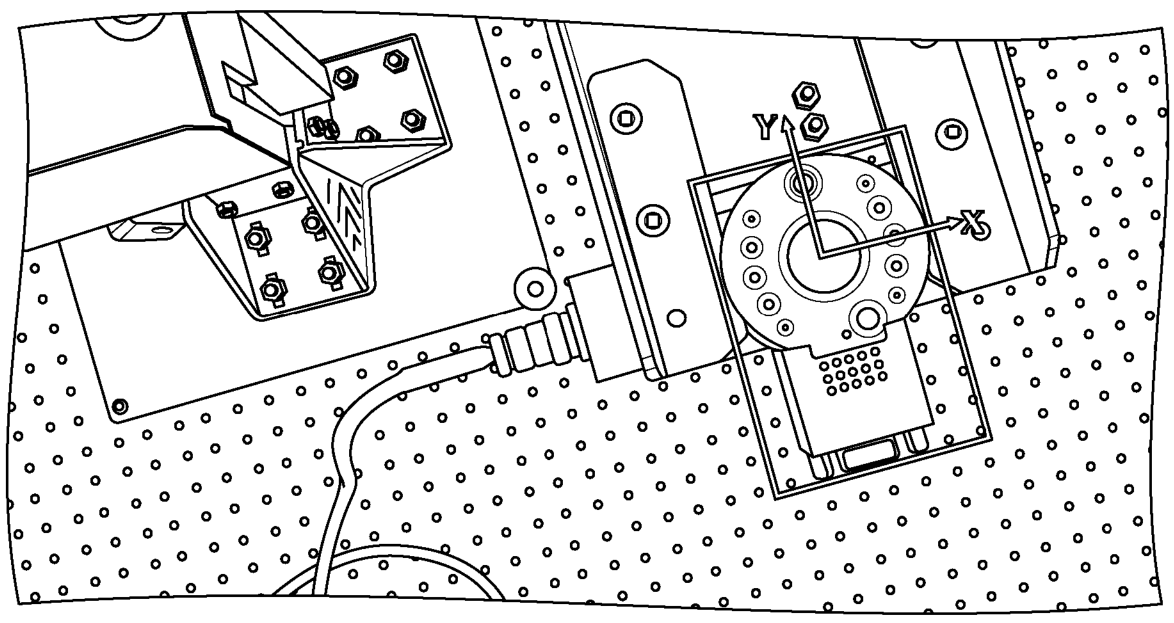
FIGS. 7A and 7B illustrate an example of visual servoing.
Figure 7B:
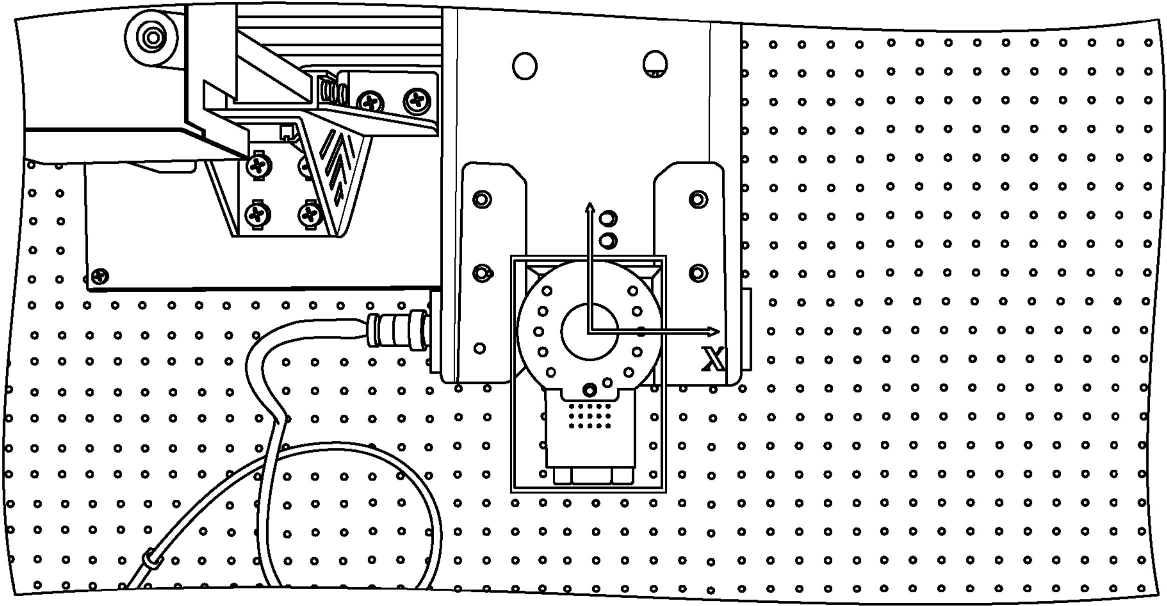

FIGS. 7A and 7B illustrate an example of visual servoing. FIG. 7A shows an image of a QC-11 tool side at an initial position of the robotic arm. FIG. 7B shows an image of the QC-11 tool side after the visual servoing process.

Rapid chemistry and processing development has increased the performance of perovskite solar cells (PSCs) in an unprecedented manner, yet postdeposition annealing impedes high-throughput manufacturing. Using the system 100 of FIG. 1, $SnO_2$ and carbon charge transport films can be fabricated entirely through an integrated robotic setup utilizing inkjet printing and intense pulse light (IPL) as a high-speed postprocess annealing method. PSCs exceeding 13% efficiency can be developed by only fabricating the $SnO_2$ film through the robotic setup, but spin coating all other films followed by IPL annealing can result in successful fabrication of $SnO_2$ layer.

$SnO_2$ and carbon back contact films can be entirely fabricated through the integrated robotic setup in a high humid ambient environment (>60%), resulting in PSCs exceeding 5% efficiency. Unlike successful direct annealing of $SnO_2$ wet films, IPL annealing of wet carbon severely damaged the phase and morphology necessitating rapid solvent removal before IPL annealing. The system 100 can be configured for utilizing IPL in an entirely automated fabrication line, allowing for scalable fabrication of PSCs through non-roll-to-roll.

Figure 8A:
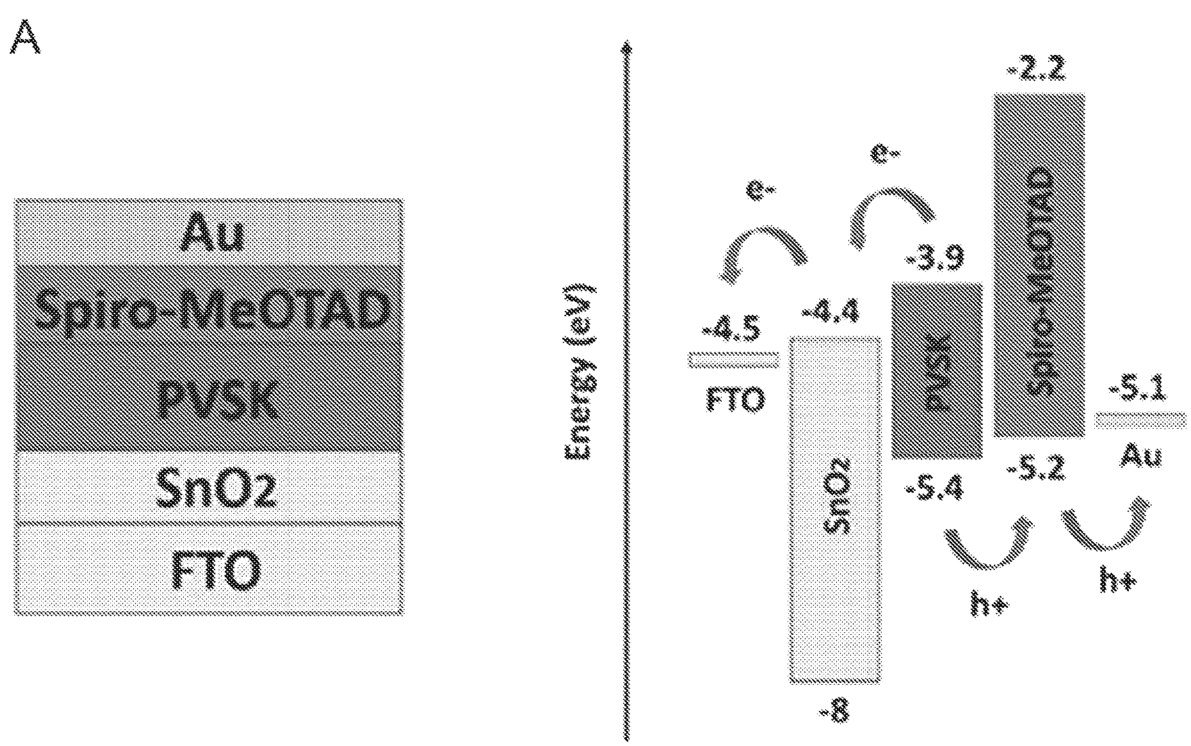
FIGS. 8A-8B illustrate fabrication of two different conventional carbon PSCs with n-i-p structures.
Figure 8B:
Figure 8B:
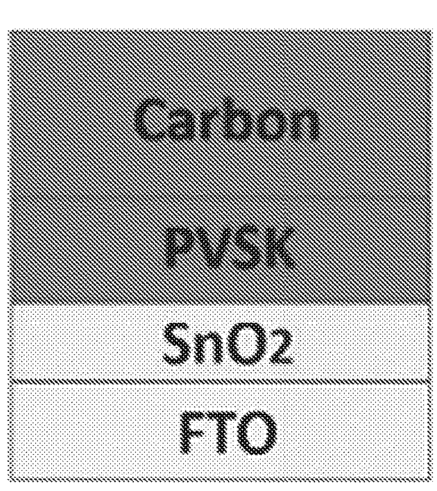
Figure 8B:
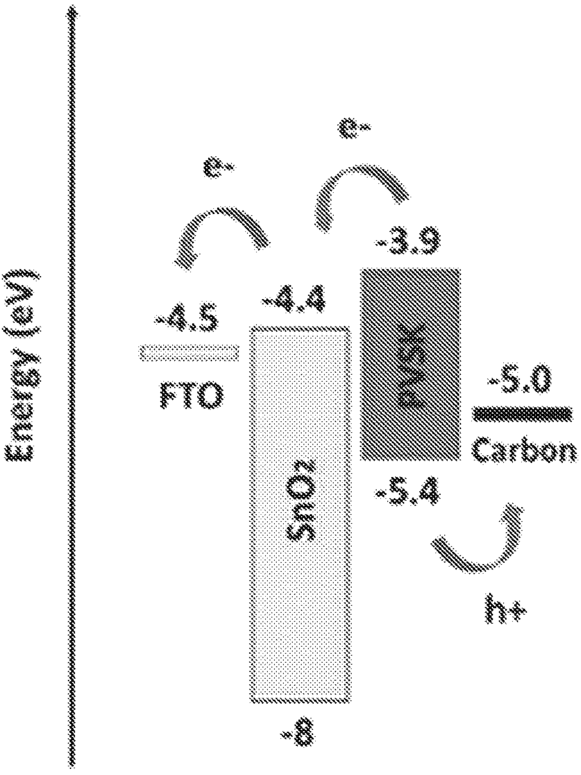

The system 100 can process the charge transport films entirely through a scalable integrated robotic setup which exemplifies the rapid automated fabrication of PSCs using a nonroll-to-roll setup. FIGS. 8A-8B illustrate fabrication of two different conventional carbon PSCs with n-i-p structures. FIG. 8A shows the structure and band alignment for convention PSCs. FIG. 8B shows the structure and band alignment for carbon PSCs.

The conventional n-i-p PSCs have an FTO-glass/ETL/perovskite/HTL/metal structure, where $SnO_2$ and carbon are considered for the ETL and HTL/metal, respectively. These two layers are deposited and processed using the system 100 with printing accomplished using an integrated inkjet printhead and the annealing completed using an IPL source. The printing is conducted using a Nordson picopulse system consisting of a piezoelectric mechanism actuating a needle valve that can dispense micrometer-sized droplets. Optimizing the actuation parameters can be useful to obtain the desired thin-film uniformity and morphology.

Figure 9A:
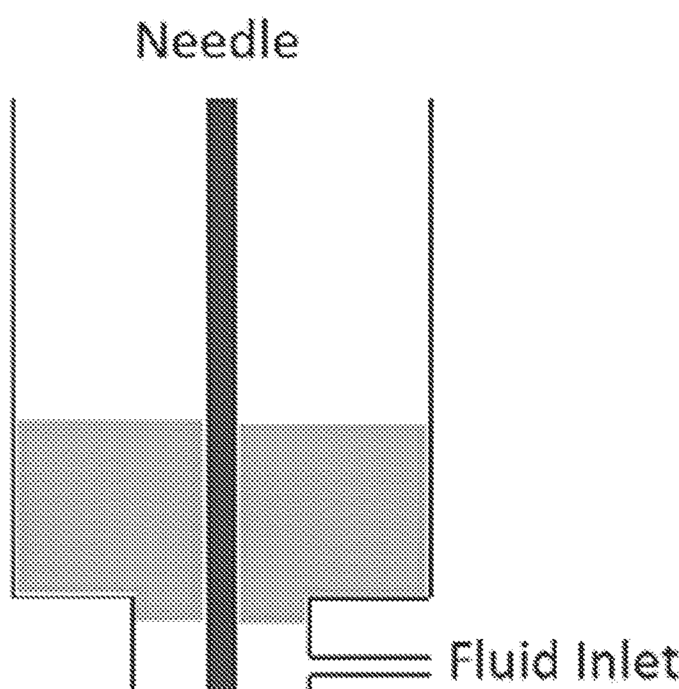
FIGS. 9A-9C show the structure as well as functionality of the piezoelectric mechanism of the inkjet printhead.
Figure 9B:
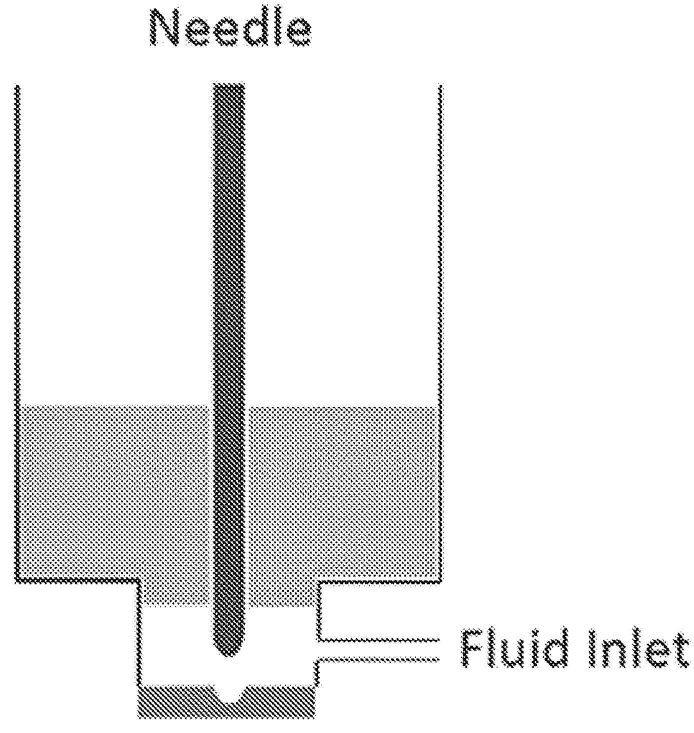
Figure 9C:
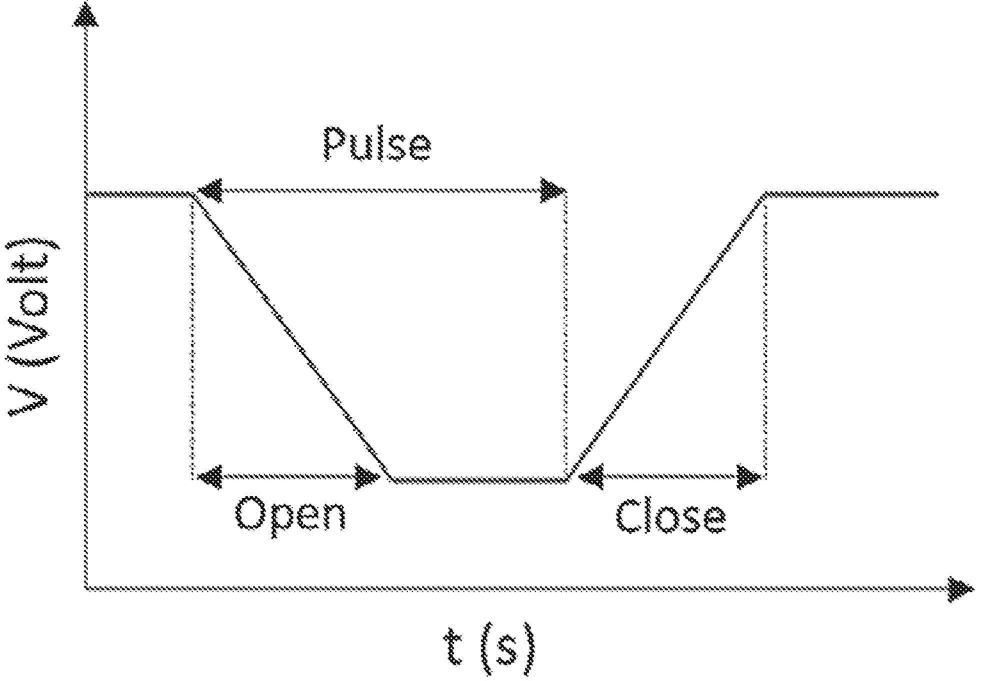

FIGS. 9A-9C show the structure as well as functionality of the piezoelectric mechanism of the inkjet printhead. FIG. 9A is a schematic of the inkjet printhead showing the needle closed. FIG. 9B is a schematic of the inkjet printhead showing the needle in an open position as controlled by an applied voltage. FIG. 9C shows the actuation behavior of the needle for one cycle, e.g., as controlled by the control system 108 of FIG. 1.

At the start of a cycle, the valve is closed by the needle, as a result of applied voltage to the actuating mechanism. As the voltage is adjusted, the needle will retract to a distance, where the stroke length is related to the applied voltage, allowing pressurized fluid to fill the reservoir between the needle's tip and nozzle. Next, the actuator is engaged again, which results in needle's tip expelling the fluid through the nozzle and sealing it off from the reservoir. The full cycle of the valve is shown in FIG. 9C, where the applied voltage, actuation speed (opening and closing time of the valve), and piezoelectric frequency (delay time between droplet dispensing) influence the film uniformity.

The piezoelectric inkjet system is capable of dispensing micrometer-size droplets in a specific period where the droplets coalesce to form bulk lines, which is driven by the precursor properties, such as viscosity, concentration, surface tension, as well as actuation parameters to develop uniform films with good morphology. For both depositions, the stroke and frequency of the printhead as well as line distancing are studied to create continuous films with desired thickness.

An evaluation was performed on several different example fabrications. Printed $SnO_2$ lines were measured at a constant dispensing frequency of 40 Hz but different stroke percentages, defined as the ratio of needle retraction from the full retraction range. Low stroke percentage of 45% resulted in isolated droplets with an average diameter of 90 μm, which can be attributed to the insufficient force to allow for uniform distribution of droplets on the substrate. Increasing the stroke to 50% resulted in continuous lines with an average width of 310 μm but with irregular edges. At 55% stroke, uniform lines with 350 μm width were deposited. The formation of continuous lines after 50% stroke can be attributed to the deposition robustness as a result of more forceful dispensing at a higher stroke, and the formation of wider lines with straight edges at the 55% stroke can be attributed to the coalescence of larger-volume droplets adjusting the line quality. Notably, increasing the stroke to 60% resulted in a nonuniform line with 400 μm width and numerous surrounding random droplets, indicating an upper limit.

Dispensing frequency determines the number of dispensing droplets in a particular area during deposition, thus, playing a significant role on printing quality. The quality of printed $SnO_2$ was measured at the optimal stroke of 55% but with different frequencies. As indicated, at 25 Hz, the print exhibited an irregular line of 453 μm width, whereas an inhomogeneous line of 872 μm width was formed at 100 Hz, indicating overdeposition of the material. These results suggest that the stroke and frequency of 55% and 40 Hz are the optimum parameters and are selected to print the $SnO_2$ films for PSC fabrication. It is noteworthy that other strokes and frequencies were investigated; however, the provided values reflected the optimum condition, exhibiting a distinguishable change.

Besides optimization of the printhead parameters, line distance, determining the distance between two adjacent printed lines, plays a significant role on forming continuous films. To evaluate line distancing, four different line distances of 350, 525, 700, and 875 μm were selected to deposit $SnO_2$ films. The line distances of 350 μm and 525 μm developed continuous films but resulted in nonuniform morphology upon IPL annealing due to the Marangoni effect caused by the evaporation of thicker wet films at closer line distances. At 700 μm, an average 40 nm-thick continuous film with uniform morphology was obtained, which can be attributed to the formation of $SnO_2$ films from thinner wet films upon annealing. Notably, at 875 μm, the lines did not merge to form uniform films; hence, the line distancing of 700 μm was selected to fabricate $SnO_2$ films for PSCs.

To complete device fabrication, carbon films were deposited on top of the perovskite film by inkjet printing and annealed by IPL. The impact of three applied strokes at a constant frequency of 25 Hz was evaluated on the quality of printed lines. The 60% stroke resulted in non-uniform drop dispensing, whereas higher strokes of 65% and 70% developed continuous films with 570 and 1000 μm width, respectively. Notably, increasing the stroke increased the irregularity of the lines at the edges. The quality of printed carbon was evaluated using different dispensing frequencies at the constant dispensing stroke of 65%. At the lowest applied frequency of 10 Hz, nearly perfect droplets with 631 μm diameter were formed; however, the droplets did not merge. At 25 Hz, continuous lines with non-uniform edges were formed. Increasing the frequency to 40 Hz resulted in straight-edge continuous lines with 668 μm width; however, at a high frequency of 100 Hz, the film width increased to 1144 μm and irregular boundaries with random droplets were observed, which can be attributed to the excess deposition of the material at extreme deposition frequency.

These results indicted optimum deposition of both $SnO_2$ and carbon films at 40 Hz; however, optimum carbon deposition required 10% higher stroke, which can be attributed to the higher viscosity of the developed carbon ink compared with $SnO_2$. To develop films, the previously determined optimum dispensing parameters were utilized to print carbon ink in a striped pattern; hence, the distance between printed lines plays a significant role on the morphology and thickness of film.

These evaluations showed that the optimal deposition parameters play a vital role on the morphology and performance of PSCs. The optimization demonstrated that a larger stroke is required for higher-viscosity precursors. At a very low stroke, stochastic droplets with different sizes were impinged on the surface, which was attributed to insufficient force-forming reproducible droplets in a straight pathway. At higher stroke rates, the thickness and width of the printed lines were increased, forming more nonuniform prints with irregular edges, which were attributed to more intensified impinging of the larger-volume droplets to the substrate.

At an optimal dispensing frequency, straight lines with uniform boundaries were formed, yet increasing the frequency increased the line width as a result of more material deposition. Similarly, the line distancing, forming a film of the material, was found to play a significant role on the morphology, thickness, and conductivity of the film.

IPL annealing of the wet $SnO_2$ films printed at shorter line distances indicated nonuniform morphology as a result of Marangoni's effect. Similarly, IPL annealing of the wet carbon films severely damaged the morphology and degraded the carbon film; however, naturally dried carbon films exhibited uniform morphology. The faster drying of wet carbon films in the printing chamber equipped with a hood resulted in rapid solvent evaporation and maintained film uniformity; however, XRD showed higher-quality carbon films upon IPL annealing at 100 J-100 μs condition. PSCs fabricated using the conventional method, where merely the $SnO_2$ film was deposited using inkjet printing, exhibited maximum PCE of 13.08%, whereas the PSCs with inkjet printing of all charge transport films exhibited maximum efficiency of 5.03%, which was attributed to the lower conductivity of the carbon films and elimination of HTL. Therefore, the system 100 can be used for the fabrication of PSCs, where the charge transport films were rapidly and entirely fabricated through a nonroll-to-roll setup utilizing inkjet printing and IPL annealing.

The system 100 can also be configured for a PEDOT: PSS polymer ink deposition printing process realized with the help of an automated Direct Write Inkjet system. PEDOT: PSS is a highly conductive ink that possesses good film forming capabilities. Applications thus include printing thin films on flexible substrates for tactile (touch) sensors.

The formation of the continuous lines or films with a single nozzle inkjet printer requires control of the droplet overlap on the substrate with an adequate resolution. It is especially critical in the case of the various conducting materials, such as nano/micro particle inks, and conducting polymer composites including PEDOT: PSS ink used in this study. Droplet overlap in a single printed line and line spacing for a film are the key parameters in the inkjet printing process that determine the properties of the fabricated planar structure—uniformity of the printed film—constant thickness across the whole area of the film.

To assure uniformity of the printed PEDOT: PSS films with Pico Pulse, an approach can be used that enables synchronization between the dispensing process of the printhead and motorized stage motion, expressed by the following formula, $$V_s(t)=f_D(t)d_{dot}$$

where $V_s(t)$ is a motorized stage velocity, PhD is a deposition frequency, and $d_{dot}$ is a spacing constant, a measure of the droplet overlap. Here low values of $d_{dot}$ would result in a high overlap of the droplets, and large values would produce the opposite situation.

Figure 10A:
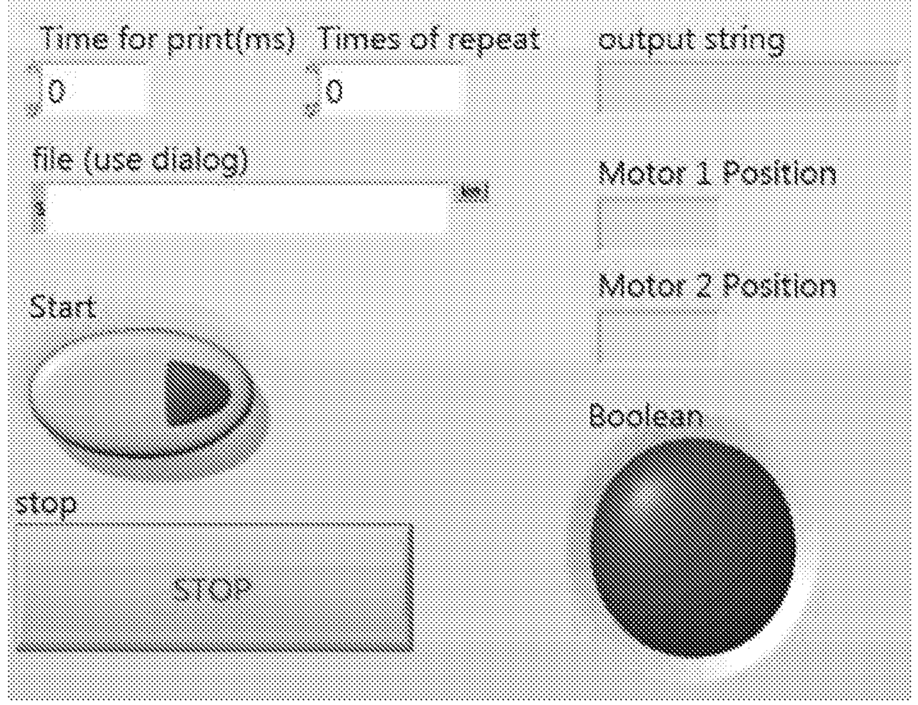
FIG. 10A shows an example of the user interface.
Figure 10B:
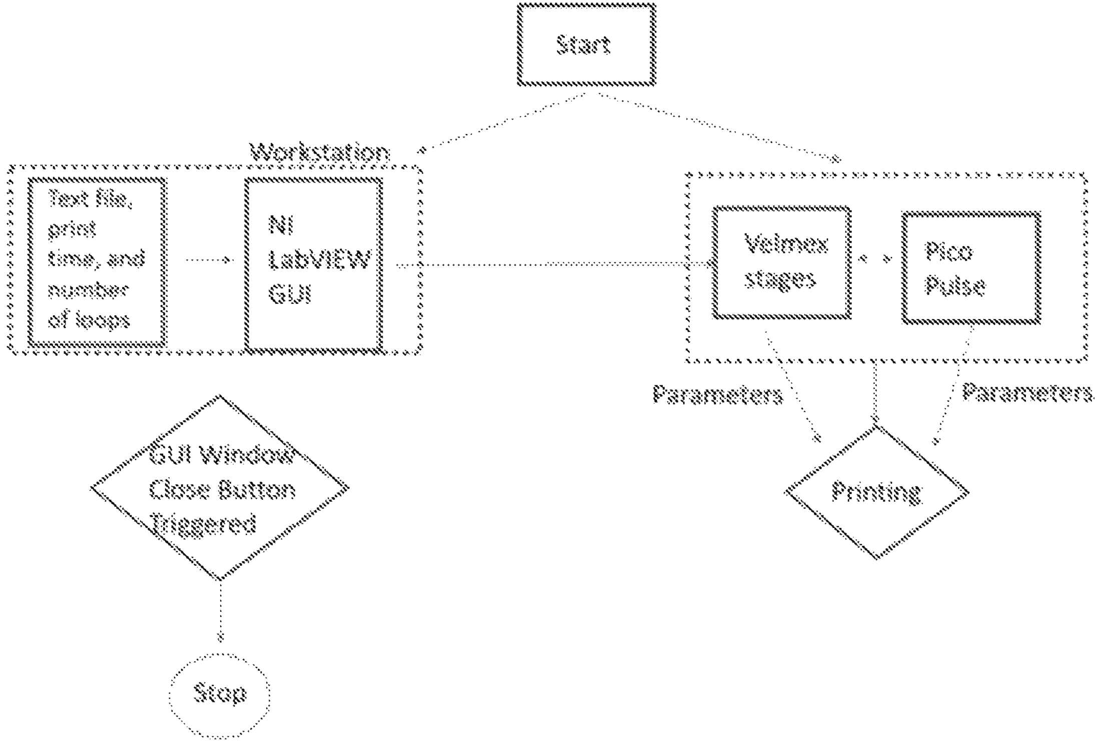
FIG. 10B is a flowchart for the program carried out using the user interface for the printing process control.
Figure 11:
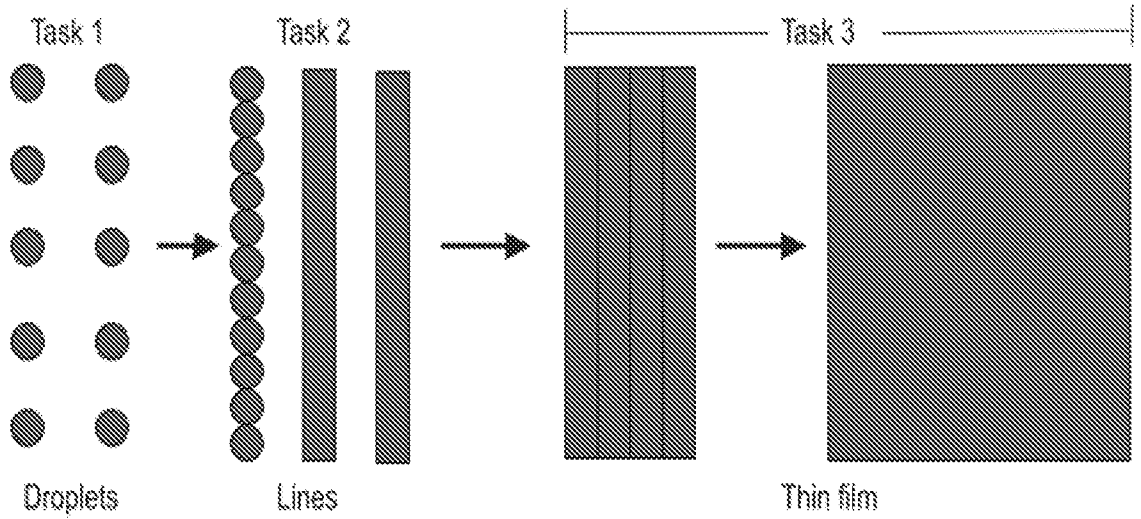
FIG. 11 is a process diagram illustrating the process that was followed to form the films of PEDOT:PSS.

To conduct deposition and film printing experiments with adequate control, a user interface (e.g., made using National Instruments LabVIEW®) was developed, enabling synchronization of the Pico Pulse® and motorized stages. FIG. 10A shows an example of the user interface. FIG. 10B is a flowchart for the program carried out using the user interface for the printing process control with two stages and the Pico Pulse®. FIG. 11 is a process diagram illustrating the process that was followed to form the films of PEDOT:PSS.

The user interface can include:

Input terminals:

"Time for print"—duration of the dispensing procedure needed to print a single line of a specific length (FIG. 11, Task 2) corresponding to the deposition frequency (fD).

"Times of repeat"—# of iterations (loops) desired for producing a film (FIG. 11, Task 3).

"File (use dialog)"—file path for document with text-based commands for Velmex® stages controller: speed of motorized stages (VS), step size (min)–7 μm). Commands written to produce a single line of a specific length.

Output terminals:

"Output string"—indicates which command (from Velmex® code) is currently executed "Motor 1, 2 Position"—indicates coordinates for the motorized stages.

A simplified diagram depicting the integration scheme of the Pico Pulse® and Velmex controller is shown in FIG. 10B. The LabVIEW program inputs included:

Control of the motorized stages speed, Vs(t) and displacement

Remote initiation of the dispensing using Pico Pulse®

Programming specific motion path (printed pattern) for the stages with the help of text-based code for Velmex® stages controller Once the PEDOT:PSS droplet diameter was known for a specific set of parameters, then with the help of the above equation we were able to determine the required separation distance between each droplet to form a continuous line, and a film consequently based. Droplets were combined to form a line, and lines were combined to form a film—as described in a diagram (FIG. 11).

Applications of Inkjet printing were demonstrated as the method for fabrication of thin films of PEDOT: PSS. Dispensing of the PEDOT: PSS was realized using the Nordson EFD® Pico Pulse system, which is controlled by many different parameters. The Taguchi Design of Experiments (DOE) method was used to identify the optimal set of parameters for minimizing droplet diameter on plasma treated Kapton substrate. Characterization of the printed features was conducted with the help of optical microscopy and the Dektak Profilometer. Experimental characterization data reveals that PEDOT: PSS droplets deposited on plasma Kapton have a minimum diameter of around 482 microns. The parameters that resulted in the minimum diameter gave a film thickness of around 300 nm. Thus, plasma treatment allows for successful printing of the films that have the morphology comparable to the films that were fabricated in the cleanroom.

The placement of SMD components is usually performed with Cartesian type robots, a task known as pick-and-place (P&P). Small Selective Compliance Articulated Robot Arm (SCARA) robots are also growing in popularity for this use because of their quick and accurate performance. The use of a Lean Robotic Micromanufacturing (LRM) framework can be applied on a large, 10 kg payload, industrial SCARA robot for PCB assembly. The system 100 of FIG. 1 can be used for the placement of SMD components.

The LRM framework guided the precision evaluation of the PCB assembly process and provided a prediction of the placement precision and yield. The repeatability of the system was experimentally evaluated, as well as the resulting collective errors during the assembly. Results confirm that the P&P task can achieve the required assembly tolerance of 200 microns without employing closed-loop visual servoing, therefore considerably decreasing the system complexity and assembly time.

The SCARA robot can be integrated in the system 100 of FIG. 1. The system combines industrial robots, precision positioners and manipulators, custom fused deposition modeling (FDM) 3D printing, 30-micron (μm) line width aerosol inkjet printing, ultrasonic bonding, intense pulse light sintering, and various metrology, microscopy, and testing instruments.

Figure 12A:
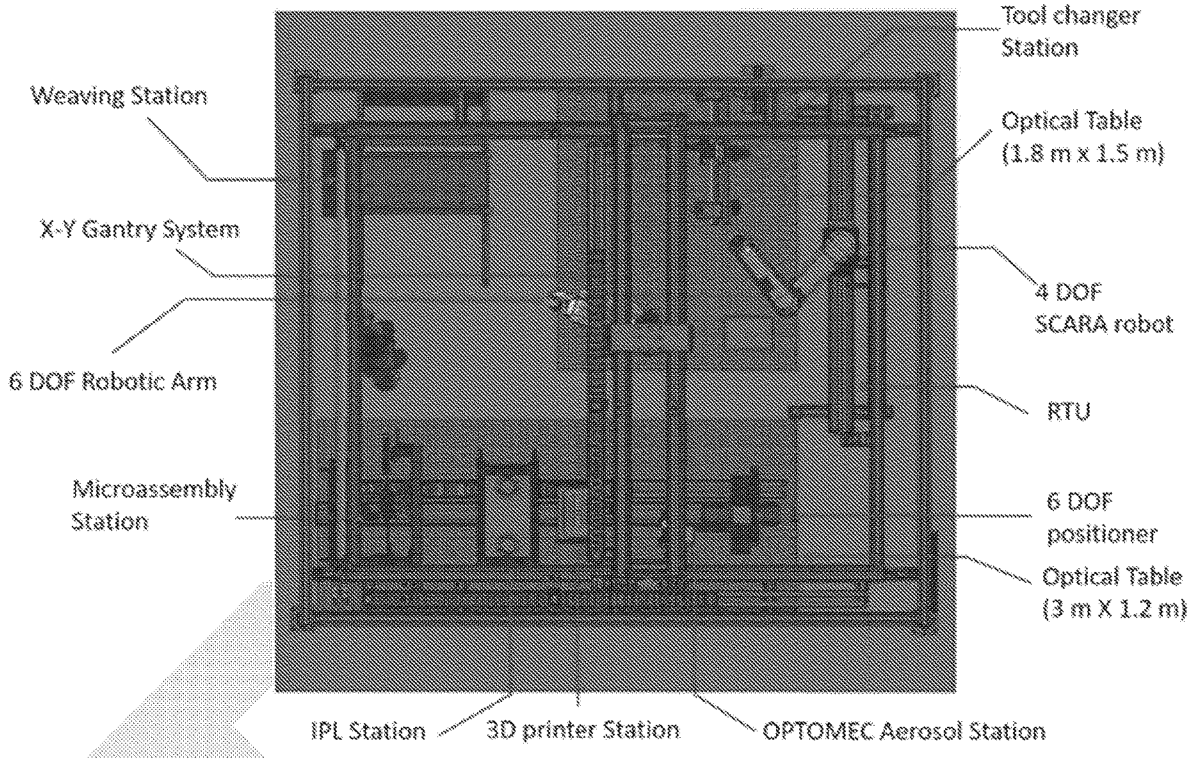
FIGS. 12A and 12B illustrate the system with the integrated SCARA robot.
Figure 12B:
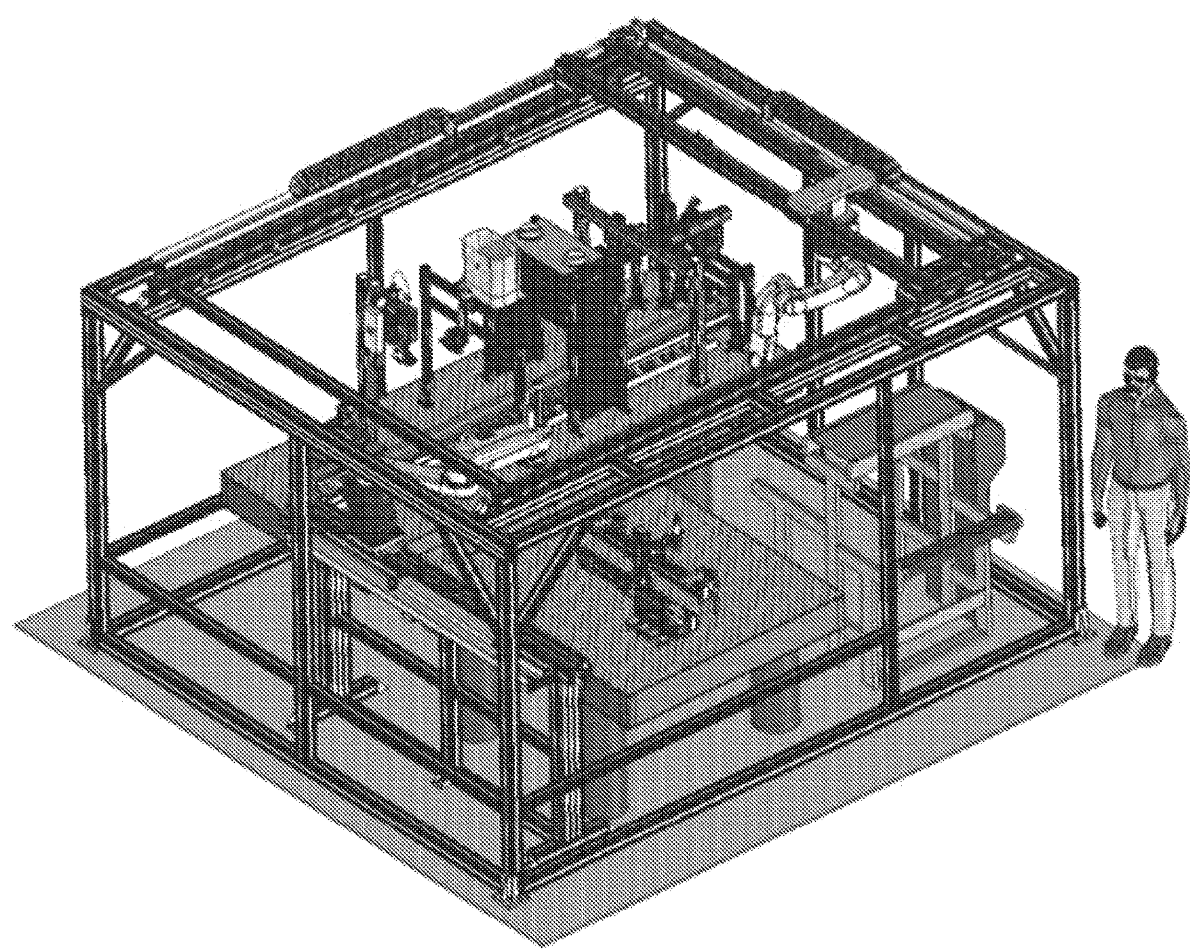

FIGS. 12A and 12B illustrate the system 100 with the integrated SCARA robot. The system includes two industrial robotic arms. One is a six-degree-of-freedom (6DOF) robot, inverted on an X-Y gantry (DENSO VS-6577-B). The other is a 4DOF Selective Compliance Articulated Robot Arm (SCARA) robot (DENSO HM-40A04). The 4DOF SCARA is the robot used for this PCB assembly project.

This robot has a reach of 1,000 mm, speed of 8780 mm/s, Z-travel of 400 mm, maximum payload of 10 kg, and 360-degree range of motion. The manufacturers listed repeatability for this robot is +−25 microns. The SCARA robot is mounted on a robot transfer unit (RTU) with a 2000 mm travel range. The system also features several modular, quick-change tools with discrete end-effectors, enabling automatic changing between tools for either of the industrial robots. The tools that were used for the PCB assembly include an electric gripper, pneumatic injection auger valve, and vacuum nozzle. Overall control of the NEXUS is accomplished via a NI PXI chassis running LabVIEW Real Time.

Figure 13:
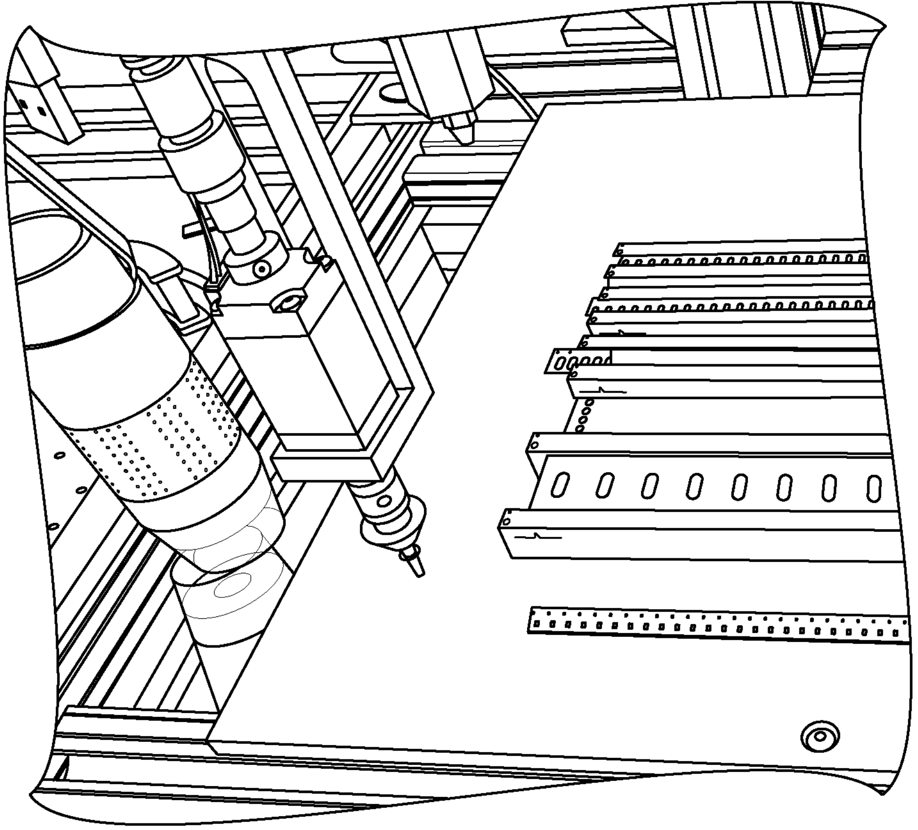
FIG. 13 shows an example PCB assembly station.

FIG. 13 shows an example PCB assembly station. The PCB assembly station includes a PCB holder and separate component cut-tape holders. The system is mounted on a vibration control platform, an optical table. Its removable tool fixtures include 1.0 mm inner diameter vacuum nozzle (Juki 504) for picking up the components. A hollow shaft stepper motor rotates the nozzle 360 degrees with 800 steps per rotation providing a 0.45-degrees precision step size.

In some examples, a surface mount capacitor, type X7R size 0805 can be used. The size code 0805 refers to the length (0.08 inch) and width (0.05 inch). A cut tape was used for experiments that had a measured spacing between components of 4 mm.

Figure 14:
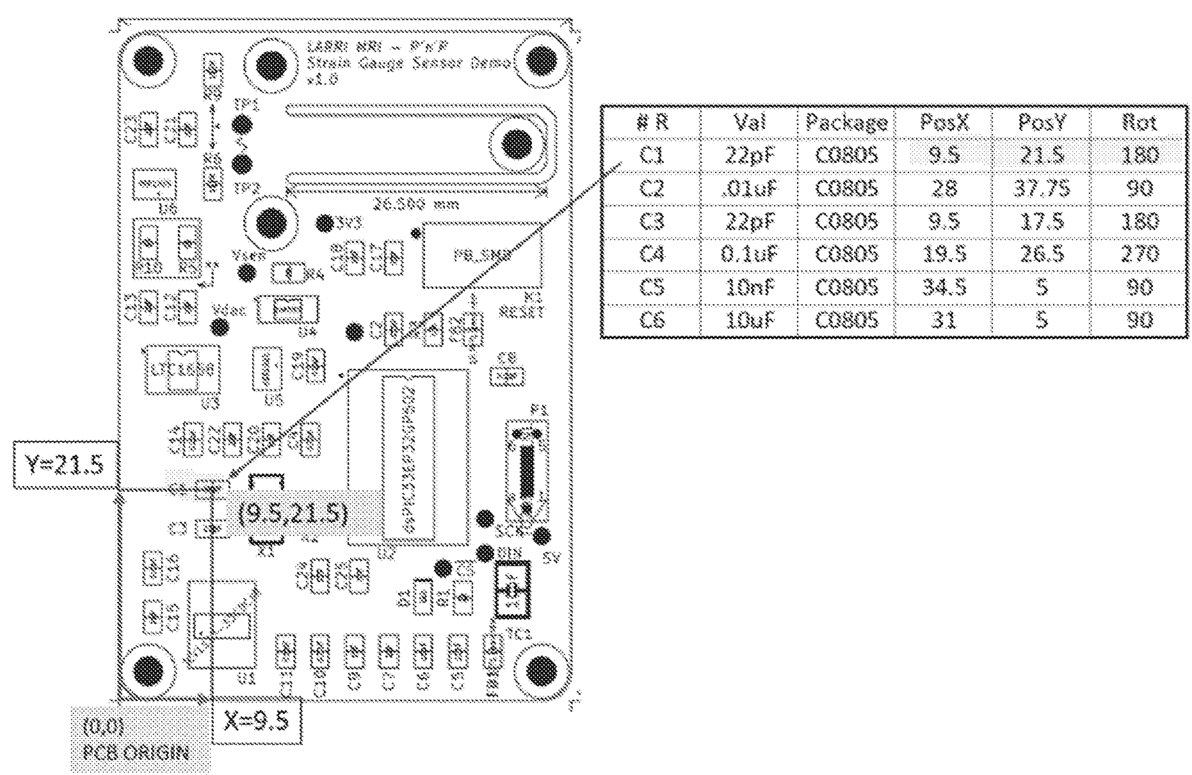
FIG. 14 shows an example PCB design that was used for experiments to evaluate the PCB assembly process.

FIG. 14 shows an example PCB design that was used for experiments to evaluate the PCB assembly process. FIG. 14 shows the design drawing and the part location script as generated by the design software. This script is used in the Labview program to direct the SCARA robot to the component location in PCB reference frame as part of the PCB assembly. The PCB origin shown in FIG. 14 is determined as part of the calibration process along with the component locations.

Lean Robotic Micromanufacturing is a design framework for multiscale (macro-micro) manufacturing work cells. LRM uses statistical analysis to assess and predict the success rate of a robot work cell, using the so-called High-yield Assembly Condition (HYAC). The LRM methodology can be used for determining the minimum of control complexity necessary to reach reliable results for the PCB assembly with the large payload SCARA robot of the system shown in FIGS. 12A-12*b*.

Figure 15:
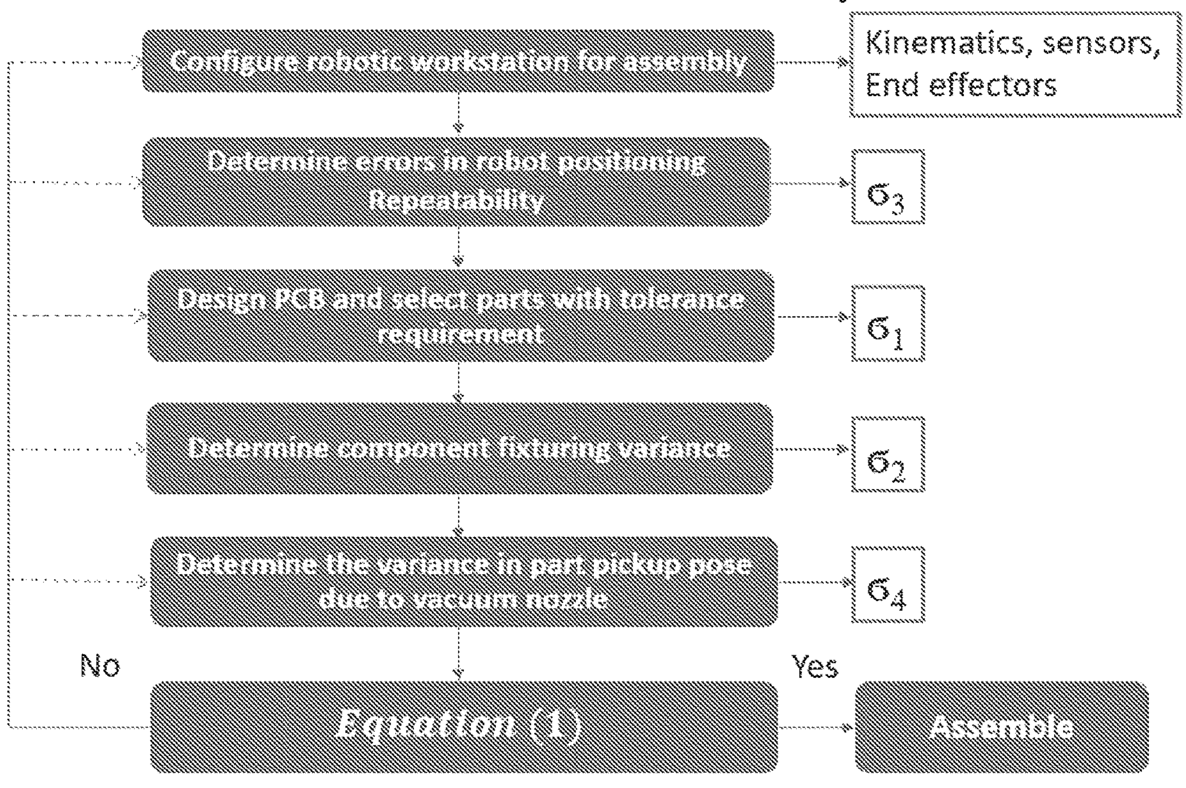
FIG. 15 provides a flow diagram of the LRM framework.

FIG. 15 provides a flow diagram of the LRM framework. The first step is to configure the robotic workstation for assembly, which has been described in the previous sections. Step 2 of the framework is to determine the errors in the robot positioning by determining the robot's repeatability. In Step 3, we use the information from Step 2 to select or measure the maximum assembly tolerance of components. In the case of the PCB experiment, this step led to the selection of the component size and the oversizing of the PCB pads. These decisions provide a bound on the maximum assembly error tolerance. In Steps 4 and 5 we determine the variance in part location due to fixturing errors, and the variance in part pickup position due to prehension of the parts with the vacuum nozzle.

Experimental evaluations showed a large 10 kg SCARA robot placing components on a printed circuit board. The Lean Robot Micromanufacturing (LRM) framework was implemented for the evaluation of the yield of the surface mount component pick and place operations. The LRM revealed the design tolerances and determined the system component errors, and control method to ensuring a high yield for PCB assembly. The precision analysis results both met the High Yield Assembly Criteria (HYAC) of the LRM and was validated by experimental results. The SMD component placement experiment showed an average error within design tolerance of 200 μm. As a result, the control method needed to perform this task was "calibrated open-loop," such that no visual servoing was required.

In some examples, the system can include an up-facing camera to provide correction for the fixturing error. The system can include a control decision matrix for robot operation and automated solder dispensing and reflow.

The system 100 of FIG. 1 can be configured to perform IPL. Experiments were performed using an Optomec Decathalon Print Engine. The engine is comprised of three components: the print module, process cabinet, and KEWA module software. This print module comprises an ultrasonic atomizer and deposition head. An ultrasonic atomizer generates pressure waves to create standing capillary waves with wavelength equal to the desired particle diameter. The crests break free of the waves to generate mist that is sent to the deposition head. The pressure waves are controlled by an ultrasonic transducer. The transducer current, atomizer flowrate, sheath flowrate, and system temperatures are controlled through the KEWA software. The KEWA software interfaces directly with the process control cabinet.

The printing motion is controlled by a six degree-of-freedom slide deck stage (6 DOF) on which the substrate is mounted. The deck is moved below the print engine nozzle during printing. The printer was fitted with a 300 μm diameter nozzle for this experiment. The system is capable of printing down to one-tenth of the nozzle diameter, for this system 30 μm. The ink selected for this experiment was Novacentrix JSA-426 silver ink. This ink was selected for addition to a wider variety of substrates (i.e. Kapton film) over other brands. All print recipes were generated using this ink formula.

Figure 16A:
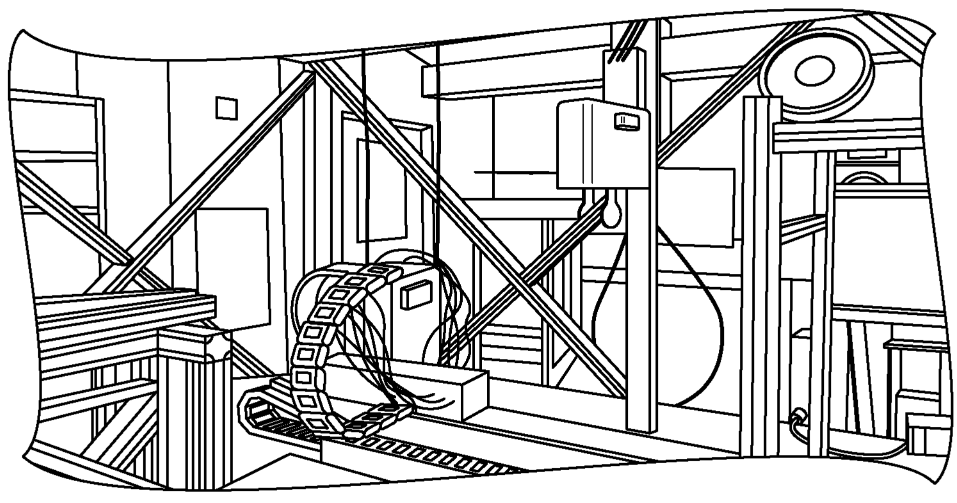
FIG. 16A shows the aerosol jet printing system within the system.
Figure 16B:
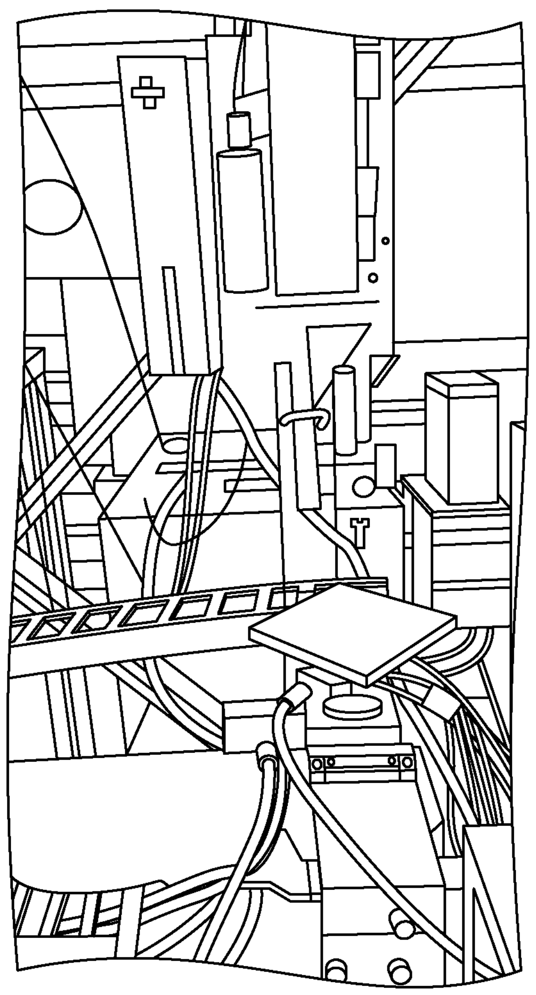
FIG. 16B shows the printer with a mounted ultrasonic atomizer module.

FIG. 16A shows the aerosol jet printing system within the system 100. FIG. 16B shows the printer with a mounted ultrasonic atomizer module.

The printing parameters were set within the KEWA module software. The atomizer flowrate was set to a value of 20 sccm. The sheath flowrate was set to a value of 130 sccm. The transducer current was set to 500 mA and the Ultrasonic bath temperature to 23° C., close to the ambient temperature. The UA heater was set to a value of 27° C. The viscosity of the Novacentrix ink required a dilution rate of 2:1 of Ink:DI water in order to reach the ultrasonic atomizer range of 1-10 cP. This recipe produced lines of 50 μm average width when viewed under a microscope. The environmental conditions of the printing remained between 69° F. and 71° F. These conditions were susceptible to generating variation in the line morphology, requiring adjustment to the process recipe. This primarily impacted the line width and continuity. Line widths of 45 to 55 μm widths were deemed acceptable for printing. Prior to attempting printing, line widths were checked and verified to ensure that the width specifications were met.

The stage speed was set to 10 mm/s and stage acceleration to 50 mm/s 2. These were adjusted to limit vibration in the slide deck during motion to prevent uneven or oscillatory line structures. Printing designs were generated using CAD software and uploaded to the slide deck. The printing was conducted using an overlapping serpentine structure, wherein each line is printed individually then the position of the printer reset for the next line in the code. This was accomplished using a shutter that blocked the mist stream exiting the nozzle while the deck moved to the start of each individual line.

A sintering process was performed. All samples were printed in a single batch. Pads were then loaded in print order into the IPL system for curing to ensure all samples had equal drying time. IPL curing utilizes xenon flash lamps to emit a wide wavelength of light over the substrate by discharging a capacitor, allowing for curing of wide areas of the substrate compared to laser sintering. Both processes cause the removal of solvent from the silver nanoparticles found in commercial inks.

The silver nanoparticles then absorb energy and decrease the particle distance, resulting in lattice diffusion and lowered interstitial boundary distance to generate a continuous structure. If the absorbed energy does not fully remove the solvent, the electrical resistance of the pads increases and lowers the resulting conductivity. If too much energy is absorbed, the polymer binding the ink to the substrate is destroyed, resulting in delamination of the pad. These phenomena represent the boundary conditions for the IPL curing.

Figure 17:
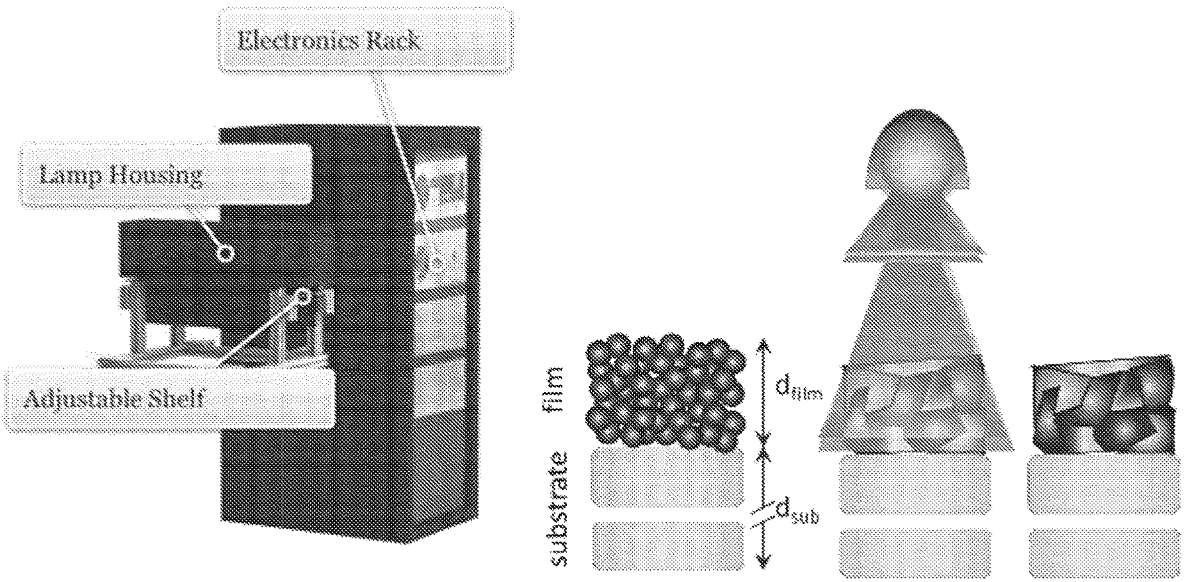
FIG. 17 illustrates the process of IPL curing, as well as the hardware setup.

FIG. 17 illustrates the process of IPL curing, as well as the hardware setup. The IPL system has four parameters to set before curing: Energy (J), Count, Duration (ms), and Delay (s). The Energy level modulates the wavelength of the emitted. The Count denotes the number of emitted pulses of light. The Duration sets the emission time, and the Delay sets the time between each emission. The energy absorbed by the substrate is controlled through the Energy, Count and Duration of emissions. The Delay does not impact the absorbed energy on the nanoparticles, and was selected as a controlled variable to remain constant at 1 s. Preliminary tests revealed high resistance in pads cured at an Energy level of 200 J. Pads cured at an Energy level of 800 J exhibited destruction of the ink surface due to delamination. Further tests modulation Count and Duration at an Energy level of 500 J revealed delamination occurs at Durations exceeding 1000 ms and Counts exceeding 9. This experiment employed a Design of Experiments (DOE) method to optimize the conductivity of silver traces printed on glass substrates. The preliminary tests were used in the generation of the parameter ranges examined.

The conductivity of AJP silver traces under IPL curing was analyzed using a General Full Factorial DOE Model with three factors at three levels each. Trials was executed using Novacentrix silver ink with an Optomec Decathlon Print Engine by 3×3 mm Van der Pauw sensor pads on microscope glass slide substrate. The Van der Pauw method was employed to determine the conductivity of the pads and analyzed first through as ANOVA General Linear Model. Further analysis (via a post-hoc Tukey) reveals the model is maximized at the highest tested parameters, indicating the maximum conductivity may lie outside the data set. A regression model was selected and found appropriate for predicting conductivity within Energy ranges of 300 to 700 J, Durations of 250 to 750 ms, and Counts of 3 to 9.

Furthermore, the order of magnitude discrepancy between previous oven cured experiments suggests the pad thickness may have other unanalyzed impacts on the sample. The methods shown here are not specific to the tested ink or post-processing method and may be used to further characterize other methods such as laser sintering.

The system 100 can be configured for manufacturing sensors such as robot skin. Enhancing physical human-robot interaction requires the improvement in tactile perception of physical touch. Robot skin sensors exhibiting piezoresistive behavior can be used in conjunction with collaborative robots. In past work, fabrication of these tactile arrays was done using cleanroom fabrication techniques such as spin coating, photolithography, sputtering, wet and dry etching onto flexible polymers.

The system 100 can be configured for an addictive, non-cleanroom improved process of depositing PEDOT: PSS, which is the organic polymer responsible for the piezoresistive phenomenon of the robot skin sensor arrays. The process includes the patterning of the robot skin sensor structures and the adaptation of the inkjet printing technology to the fabrication process. This increases the possibility of scaling the production output while reducing the cleanroom fabrication cost and time from an approximately 5 hour PEDOT: PSS deposition process to five minutes.

Testing of these skin sensor arrays was carried out on a testing station equipped with a force plunger and an integrated circuit designed to provide perception feedback on various force load profiles controlled in an automated process. The results show uniform deposition of the PEDOT: PSS, consistent resistance measurement and optimum tactile response across skin sensors.

The fabrication process uses a piezo-electric dispenser of nano-liter quantities for the deposition of PEDOT: PSS. This Piezo-electric dispenser, an Ink jetting instrument known as the Pico-Pulse system manufactured by the Nordson EFD, controls the variables, temperature, air pressure, stroke, and deposition height to characterize the deposition droplets. The experimental result discusses the outcome of depositing PEDOT:PSS on the circular tree design and on different sensor geometries using this Ink jetting dispenser.

The deposition of the PEDOT: PSS is carried through custom built Direct write Inkjet system that is part of the NeXus micromanufacturing platform (FIG. 3) which consist of the following components:

The Nordson EFD Pico Pulse® ink jetting instrument with a piezoelectric actuator print head with 50 micron nozzle and fluid syringe.

Nordson EFD Pico Pulse® controller.

3 DOF positioner used to control height adjustment and sample displacement during the printing.

Air pressure gauge.

NI LabVIEW® based User Interface (UI) for motion control of the motorized stages.

Figure 18A:
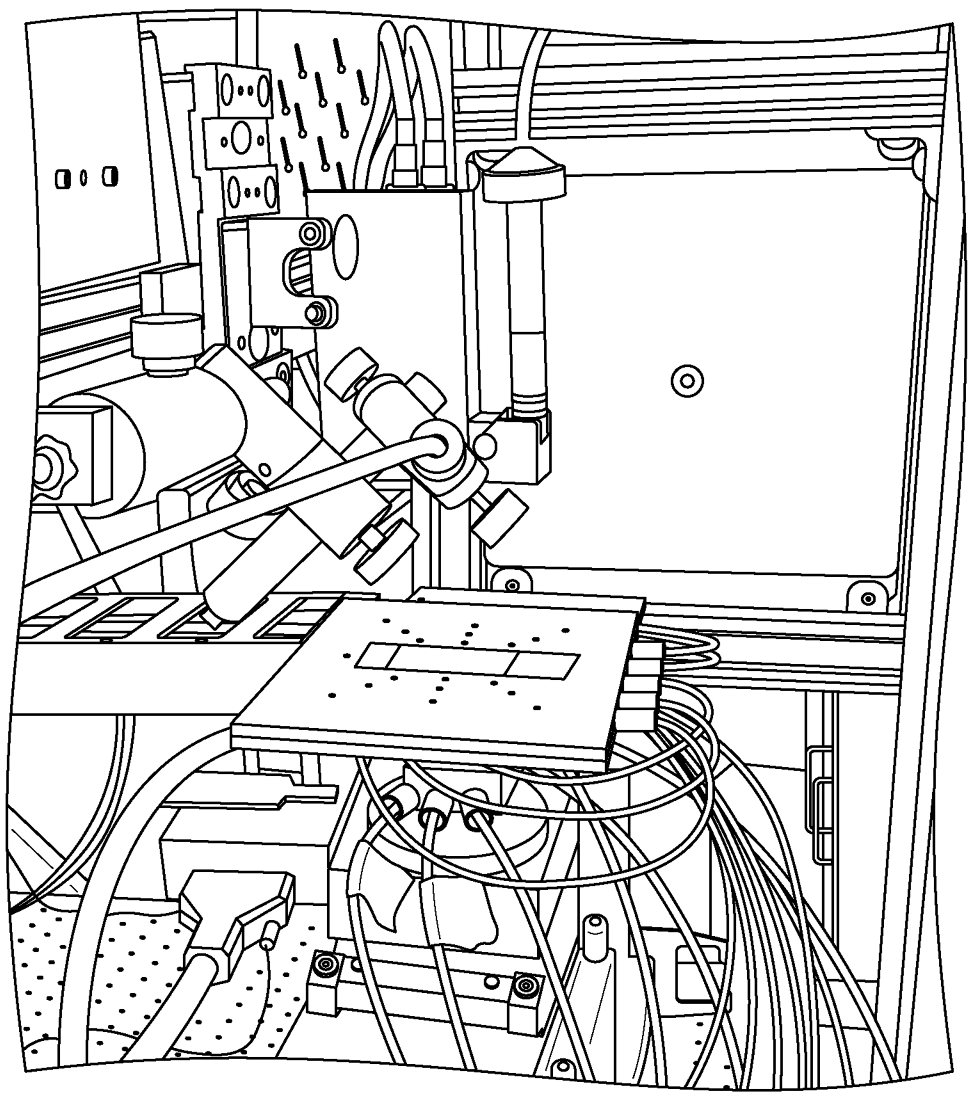
FIG. 18A shows the Pico Pulse experimental setup.
Figure 18B:
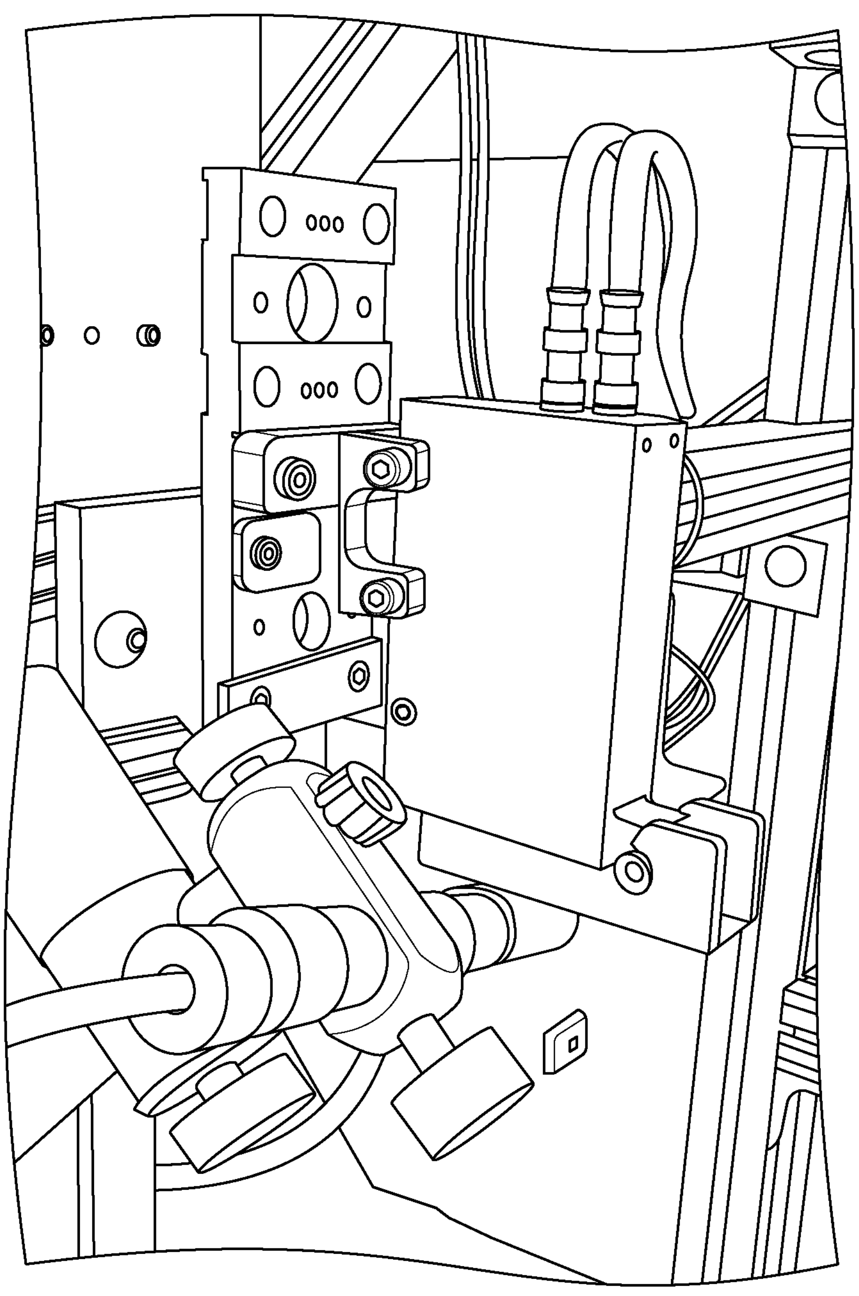
FIG. 18B shows a schematic view including a cross section of the valve assembly, with a cartridge and position of its piston in closed and open mode.

FIG. 18A shows the Pico Pulse experimental setup. FIG. 18B shows a schematic view including a cross section of the valve assembly, with a cartridge and position of its piston in closed and open mode.

The motion part of the printing system consists of three motorized precision stages from Newport—two linear stages M-ILS300LMS for displacement in XY plane with 300 mm stroke and ±0.1 μm repeatability, and vertical stage GTS70VCC for Z direction with 70 mm stroke and ±1 μm repeatability. The motion control is realized through Newport XPS-D8 controller, National Instrument PXI platform with real time PXIe-8861 controller, and NI LabVIEW UI allowing path and motion programming-based G-code. The sample chuck with vacuum clamping mechanism for substrates, is attached to the top of the Z stage.

The Pico Pulse® printing head is mounted above the sample chuck along with camera for the inspection of the ink deposition process. All the dispensing parameters are controlled and adjusted with the help of Nordson EFD Pico Pulse controller with proprietary UI. The following dispensing parameters can be adjusted during printing process:

Waveform times (open/close/pulse).

Cycle—droplet dispensing period corresponding to dispensing frequency, fd. Determines the frequency of the droplet jetting during printing (1-250 Hz).

Stroke—ink droplet jetting force. Expressed in %, where maximum force corresponds to 100%.

Deposition Height, h (3 mm): Distance from the printer head's nozzle to the substrate.

Temperature, Ti (40° C.): Temperature of the ink.

Air Pressure, pa (20 psi): Fluid pressure in the printhead's valve assembly.

Based on results from our group's previous study of the inkjet deposition of high viscosity fluid (UV adhesive) with the help of Pico Pulse system, we have determined set of the dispensing parameters for PEDOT: PSS/DMSO/PVP solution. These parameters allow deposition of a PEDOT: PSS droplet (dot) with specific diameter dd on the Kapton substrate.

Formation of the continuous lines or films with a single nozzle inkjet printer requires control of the droplet overlap on the substrate with an adequate resolution. It can be especially useful in case of the various conducting materials, such as nano/micro particle inks, and conducting polymer composites, which often require post processing, sintering or thermal annealing respectively.

Hence droplet overlap in a single printed line, and line spacing for a film are the key parameters in inkjet printing process which will determine the properties of the fabricated structure. Considering a PEDOT: PSS/DMSO/PVP solution, which conductivity and piezo resistivity will depend on a uniformity of the printed film—constant thickness across whole area of the film and uniform distribution of the constituent polymer components: PEDOT: PSS and PVP.

To align the inkjet printing nozzle for the dispensing of PEDOT: PSS to the exact location of the skin sensors on the sensor patch, G-code is generated for precise sample displacement on 3DOF positioner. A DXF drawing lines corresponding to what will be printed is created in CAD software and imported in a "manufacturing workspace" of Autodesk's fusion 360. The Autodesk's fusion uses a cutting operation for operations such as water jetting or plasma cutting, which provides a toolpath for the manufacture process.

In this case, a cutting operation is created that models the DXF sketch for inkjet print head. The cutting operation is set to print speed of 600 mm/min and the contours of the DXF files are selected as the profile to print. Thereafter, using custom post-processor simulated within the manufacture workspace, the G-code is generated from the contours selected in the cutting operation. The G-code generated is imported into a custom LabVIEW program, which is then parsed to extract X and Y coordinates as well as a feed rate (speed) to print the PEDOT: PSS.

Each line of G-Code begins with a G-Code designator to instruct the program what kind of information will come next. For this use case, only the movement designators, G0 and G1 are needed. A G0 move represents a travel, or non-printing move. A G1 command designates a printing movement. Both commands are followed by absolute cartesian coordinates for the 6-dof positioner of the NeXus system to move to.

To summarize, the LabVIEW program takes the coordinates from each G-Code line, parses into absolute X and Y positions, then instructs the Newport 6-dof positioner to move to those positions at a given feedrate, only depositing material if the coordinates were preceded by a G1 designator. An example of a simple square in G-Code: G0 X10 Y0 Z1 F600, G1 X10 Y20 Z1 F600, G1 X30 Y20 Z1 F600, G1 X30 Y0 Z1 F300, G1 X10 Y0 Z1 F600.

The substitution of cleanroom techniques for spin coating of PEDOT: PSS, which is the organic polymer responsible for the piezoresistive nature of our robot skin sensors, with an inkjet printing approach using the Pico-Pulse was evaluated. Results show that not only is the fabrication time required to produce a sensor patch significantly reduced but it also improves the sensitivity of the sensors from 0.2 mv/N from previous study to 11.42 mV/N. This readily improves the ability of the robot skin sensors to measure minute forces below 1N. Furthermore, the inkjet printing approach makes the results easily repeatable as compared to cleanroom technique that is prone to human error and equipment malfunctions.

Inkjet printing for fabricating microstructures has enabled complex electronic circuits, components, and devices previously manufactured using 2D lithographic processes. Aerosol inkjet printing can be enabled using the system 100, which can deposit silver ink on a flexible printed circuit (FPC) substrate. In particular, the fabrication method of a 10 mm diameter circular strain gauge tactile sensor, which is annealed using oven curing or intense pulse light (IPL) process, was investigated. The resulting sensor performance under varying curing schedules is evaluated by loading packaged sensors with increasing weight, reporting a measured resistance in the 300Ω-1.2kΩ range.

The fabrication processes includes the use of an aerosol inkjet printer, a curing procedure of the sample both with oven and IPL, and the soft bedding encapsulation used for the testing procedure. The performance of the printed sensors was evaluated with the 4-point probe method. The baseline resistance of the printed sensors reduces with an increase in curing cycles in the IPL as does with an increase in the duration of the curing of the sample in the oven. But this thus seems to impact the sensitivity of the printed sensors as the oven-cured appears to be more sensitive with longer curing time as compared to the IPL which has a faster curing time.

The tactile sensors were printed with an aerosol inkjet printer from OPTOMEC®, which functions as a strain gauge. This means the structure upon deformation transforms applied strain to varying electrical resistance simultaneously. Proposed in this study is a 10 mm diameter star-shaped tactile sensor inspired by the conventional serpentine strain gauges, fabricated using NovaCentrix® JS-A426 silver ink and then cured by IPL.

Figure 19:
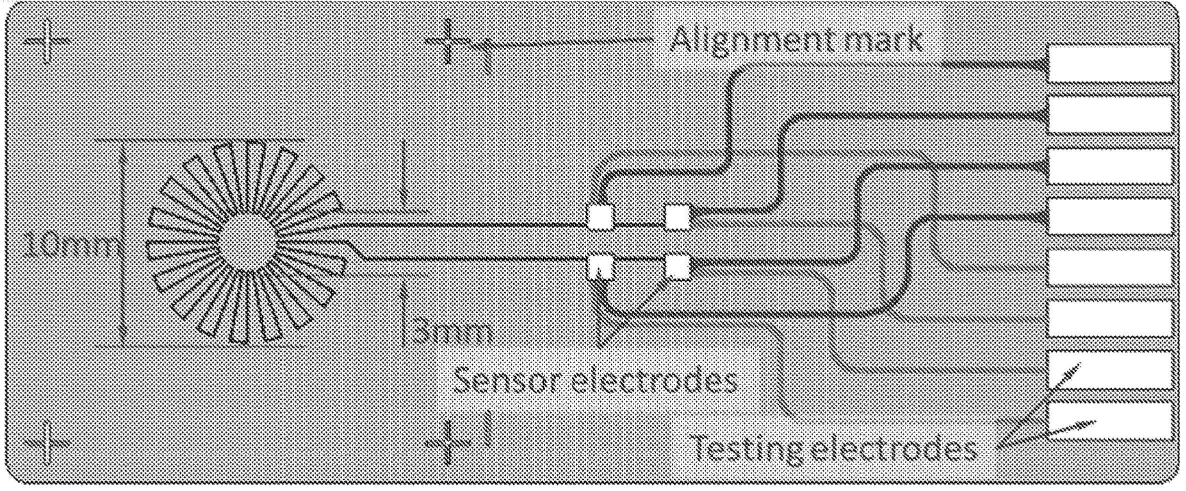
FIG. 19 shows the design of the tactile sensor.

The star shape tactile structure was designed with a trace width of 50 μm; printable with the aerosol inkjet nozzle tip of 300 μm. The NovaCentrix® silver ink has a conductivity of 9.2×105 Ω·m and can produce an average strain gauge resistance of 1.56 kΩ. This can be derived using the total length of the star gauge tactile structure which measures 173.11 mm. FIG. 19 shows the design of the tactile sensor.

The OPTOMEC® Aerosol inkjet print system is a subsystem of the system 100 of FIG. 1. The aerosol jet printing station, inspection station, and IPL are part of the inkjet printing system. The Aerosol jet printing station comprises a control cabinet for directing the ink streaming process through the print head, KEWA process control software, and a 6DOF positioner for aligning the substrate to the 300 μm nozzle tip with a 3-5 mm standoff distance.

The trajectory path for the Inkjet printing of the tactile sensor is used to provide the 6DOF positioner accurate description in X and Y coordinates for the precise alignment of the fixed inkjet printer nozzle tip to the flexible printed circuit. This is created through, e.g., an open-source computer aided-Manufacturing (CAM) tool called Inkscape, which is a vector-based graphics editor with a G-code path generator extension. The design of the tactile sensor is uploaded in the workspace of the Inkscape interface, and the G-code file is generated into G-code paths present within the extension tab. The G-code files are uploaded into the Newport controller responsible for feeding the precise coordinates for the Inkjet printing of the silver ink.

After the deposition of the silver ink, there is a need to cure the printed ink, removing the solvent allowing for compactness of the silver nanoparticles. The curing process ensures the fusion of these particles, thereby increasing their conductivity. For the curing process, Xenon® Intense pulsed light (IPL) S-2210 device and a thermal scientific Lindberg vacuum oven was used. The IPL which delivers peak energies and frequencies within a controlled experiment can successfully sinister metallic ink at precise control variables which prevents damage to the substrate.

For oven curing, the fabricated tactile sensor was placed in the oven for approximately 20 hours at 200° C. The duration of the thermal cure is dependent on the substrate. In this case, the substrate upon which the tactile sensor is fabricated is Kapton which is optimal for the intended purpose as regards the duration of the curing process within a specified number of cycles.

Therefore, the system 100 can be used for fabricating tactile sensors with the use of aerosol jet printing, providing the recipe for achieving the printed width of 60 μm. To ensure the fusion of the nanoparticles, the silver ink is cured with the Xenon S-2210 IPL (intense pulse light) and the Thermo scientific Lindberg vacuum oven.

The sintering process showed it is possible to vary the resistance of the tactile sensor for relevant applications based on the length of the curing time in the oven or the number of impulse cycles carried out with the IPL. There is linearity in the variation of load applied to the tactile sensor and corresponding resistance measured. Longer curing leads to steeper slop of the plot for both oven-cured and IPL-cured samples, and this observation may imply stronger fusion would increase sensitivity of the sensor.

Robot skin sensors are being developed to improve the tactile perception that comes with physical touch. This is desired as it enhances the interaction between robots and humans. The system 100 of FIG. 1 can be used for a process for improving the deposition of PEDOT: PSS using Aerosol jet printing technology.

The PEDOT: PSS, an organic polymer that gives the robot skin sensors their piezoresistive ability, is deposited on the designated microfabricated sensor electrodes, significantly cutting down the manufacturing time. Testing of the robot skin sensors is done on an automated testing station having a force plunger and an integrated circuit. The results display the resistance values measured across the sensors and their tactile responses to applied strain.

After the fabrication of sensor structures in the cleanroom, the resistance of each skin sensor on the sensor patch is inspected to determine the yield ensuring there is no short circuit occurrence within its links. After satisfying this requirement, the sensor is ready for PEDOT: PSS deposition process. This step begins with a plasma treatment of the substrate to improve the adhesion of the PEDOT: PSS ink to the surface.

In some examples, the PEDOT: PSS stock from Heraeus (Clevios™®) can be used and it has the following properties: 15-60 mPa·s viscosity, the conductivity of 850 S/cm, and solid content of 1.0%-1.3%. This ink has low viscosity allowing for direct application with an Aerosol Inkjet printer without the need to adjust its admissibility with other compounds. However, this type of PEDOT: PSS ink wouldn't adhere to the Kapton's surface, hence the need to introduce a plasma treatment of the substrate's surface to improve its wettability.

The plasma treatment, during an investigation, was carried out in a Herrick® Plasmer Cleaner device. The substrate was inserted into the chamber, and after evacuation and reaching low vacuum, the substrate was exposed to air RF plasma at 30 W for a 2 min period. With an effective period of 30 mins, the skin sensor patterned substrate is ready for inkjet printing of the PEDOT: PSS organic polymer using the Aerosol jet printer.

Before commencing deposition of the PEDOT: PSS after zplasma treatment of the substrate, it is important to feed the instructions in the form of precise coordinates to the aerosol jet print system. This enables precise displacement of the substrate during deposition of the ink onto the skin sensor patch. This was realized by generating G-code command lines, imported into the Inkjet print system.

The Autodesk® Fusion 360 manufacturing workspace software was used to create printing patterns in DXF format based on the design of the imported CAD model. The Autodesk® Fusion 360 provides a library and capabilities that allow simulation of the printing process based on the designed pattern of trajectory. Once the design trajectory was confirmed through simulation in the software environment, the custom post-processor was activated to generate the G-code parsed in X and Y coordinates that also indicated the feed rate, which also represents the print speed.

The OPTOMEC® Aerosol Inkjet print system is part of the system 100 which can include the following components: An Aerosol printer head equipped with a 300 μm diameter nozzle, a process control cabinet, KEWA process control software, a 6DOF positioner for carrying sample and height adjustment and a NI LabVIEW® interface for synchronizing ink deposition process and motion control of the stages. The aerosol jet printing process works using aerodynamic principles to realize PEDOT: PSS ink deposition on the substrate.

The ink placed into the ultrasonic atomizer is formed into a dense mist of aerosol droplets that are carried along the deposition path and focused with compressed nitrogen gas through the nozzle tip. The viscosity of the ink and the process recipe determining the atomizer flow rate, and morphology of the deposited PEDOT: PSS ink on the substrate are important criteria for achieving successful printing of the skin sensors.

This method of depositing PEDOT: PSS through aerosol jet printing can replace the technically challenging and time-consuming techniques applied in the cleanroom. Aerosol jet printing reduces the number of steps and time required to realize the robot skin sensor fabrication process, reducing the process time from about 5 hours to 26 mins for a laminated paired skin sensor patch. It also diminishes the likelihood of human error in the patterning of the PEDOT: PSS on the skin sensor structures, as indicated in its characterized sensitivity of 6.2 μV/N as compared to 0.4 μV/N and 5.1 μV/N of cleanroom fabricated ones.

The system 100 can be configured with additive manufacturing capabilities that can be used to prototype strain gauge based tactile sensors, namely SkinCell, on flexible substrates. An Aerosol Inkjet printer can be employed to print the strain gauge structure of the SkinCell sensor.

The design of this sensor combines curvilinear geometries representing both a radial shape structure and an arc shape structure, which have opposite gauge factors when the force is applied to the center of the sensor. The fabrication process of the SkinCell sensor is predicated on a parametric kinematic calibration of the system 100 to identify features on the sensor substrate and align them to the printing and metrology tools. Several strain SkinCell sensor samples were printed by the system and the results indicate a calibration precision of 314 microns for 60 microns line-width features.

The fabrication process of the SkinCell sensor can be realized through additive manufacturing techniques integrated within the system 100. The system 100 includes a 6-DOF micropositioner with a micro-resolution, and meter travel range, servicing an Aerosol Inkjet print head, optical microscope, and Intense Pulse Light (IPL) sintering station technique to directly print the sensor structure on the substrate in a more repeatable and reliable manner than the cleanroom fabrication process.

The kinematic calibration of the system 100 was investigated using a parametric constrained nonlinear least squares identification technique to align the substrate features with the printer nozzle. The precision of the resulting strain gauge features was measured using an optical microscope and resulted in alignment accuracies in the +/−1.33 micron and +/−0.5 degrees range for printing features width in 60 microns. The printed sensors have overall dimensions of 10 mm by 26.45 mm with 60 microns line width. The calibration precision of the sensor printing is around 314 microns.

For the SkinCell fabrication process, the system 100 has several subsystems, including industrial robotic arms, a custom 6-DOF positioner, an Aerosol Inkjet printing station, a 3D FDM printing station, a PicoPulse® deposition station, and an intense pulse light (IPL) sintering station. It also includes a microassembly station, a loom station, and a tool change station with multiple tools for two industrial robotic arm manipulators for different tasks.

Figure 20:
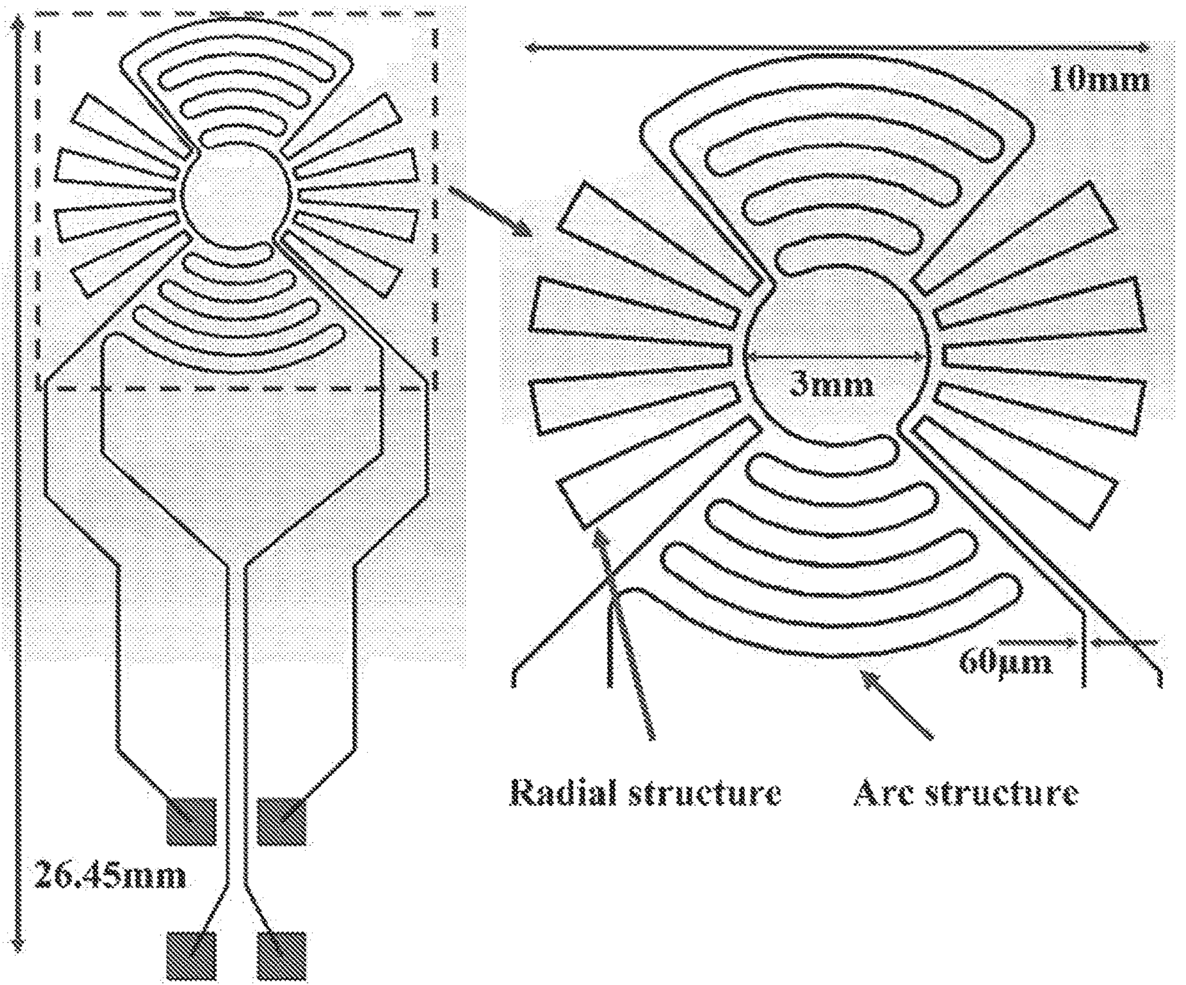
FIG. 20 shows the combined design of the strain gauge structure of the tactile sensor features.

Instead of making the double-layer sensor arrays, a prototype design of a strain gauge structure of the SkinCell sensor, which combines radial shape and arc shape structures (shown in FIG. 20), has been developed and simulated. FIG. 20 shows the combined design of the strain gauge structure of the tactile sensor features, e.g., 60 microns width lines arranged in arc and radial shape patterns.

The advantage of this combined structure is that it can be printed on only one side of the substrate and when the force is applied to the center of the sensor, the strain gauge performances of two shape structures are opposite. The resistance of the radial shape structure is increasing, while the resistance of the arc shape structure is decreasing.

However, due to the complexity of the cleanroom fabrication process of the SkinCell sensors and the low repeatability and the yield of the product during the fabrication and lamination process of the sensors, a new strain gauge sensor fabrication process was developed via the system 100 using OPTOMEC® Aerosol Inkjet printer to print the strain gauge structure of SkinCell tactile sensor on the flexible Kapton® substrate. This method can reduce the fabrication procedures and increase the repeatability and yield of products. In the system 100, several subsystems were employed to fabricate strain gauge sensors, such as OPTOMEC® Aerosol Inkjet printing station, microassembly station, and the 6-DOF positioner. Here, an oven was used to cure or sinter the strain gauge structures printed by the Aerosol Inkjet printer. The IPL station can also be employed to complete the sintering or curing process.

Figure 21:
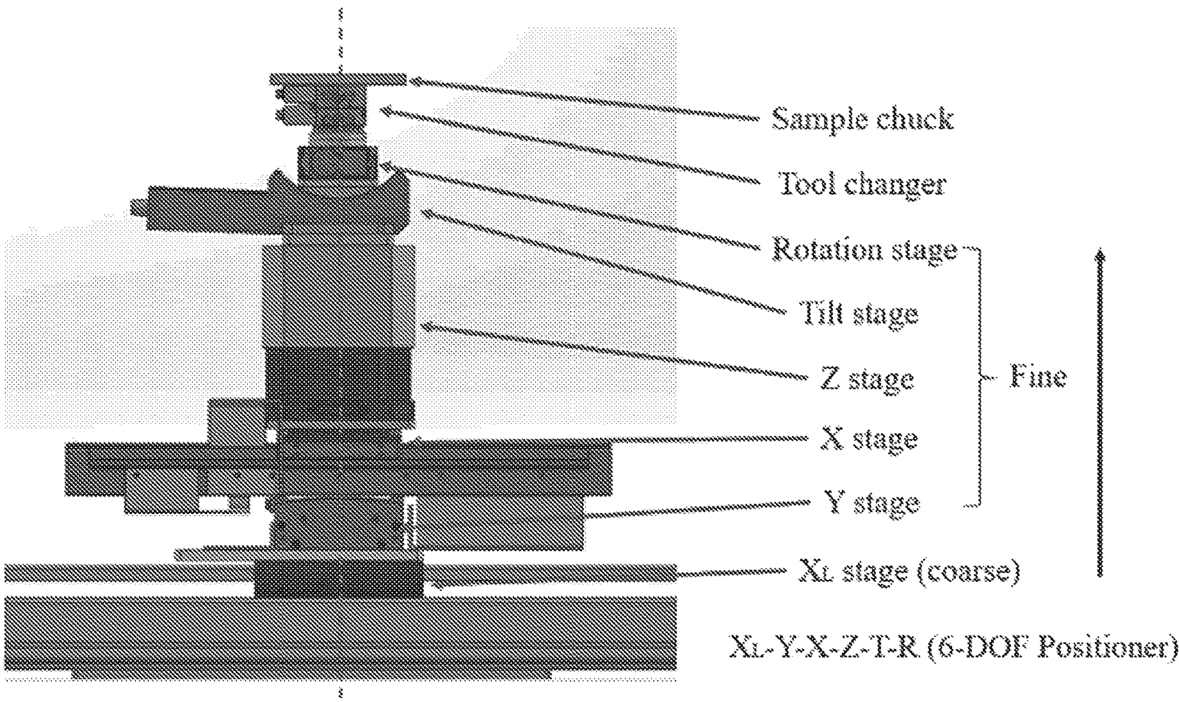
FIG. 21 shows a custom 6-DOF positioner.

To carry the substrate, a custom 6-DOF positioner has been designed and assembled in the system 100 as shown in FIG. 21. There is a long linear stage XL (IAI® ISPB-LXMX-200) and 5 high-precise motorized stages, including two linear stages X and Y (Newport® M-ILS300LM-S), a Z stage (Newport® GTS70VCC), a tilt stage (Newport® BGS80PP), and a rotation stage (Newport® URS50CPP).

They were arranged and assembled from bottom to top in order of XL-Y-X-Z-T-R. On the top of the rotation stage, an ATI QC-11 tool change coupler was used to mount the sample chuck.

Figure 22:
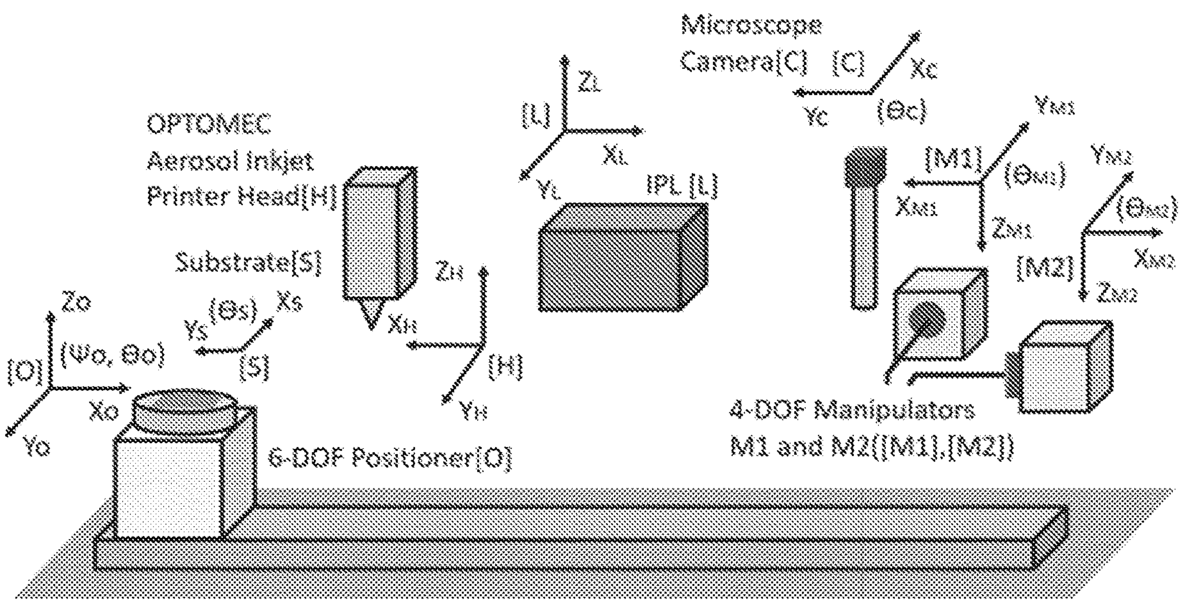
FIG. 22 depicts the coordinate system of each process station, including additive manufacturing, curing, and metrology tools.

FIG. 22 depicts the coordinate system of each process station, including additive manufacturing, curing, and metrology tools. For the strain gauge structure printing, it is first necessary to kinematically calibrate the coordinate systems of substrate [S], the 6-DOF positioner [O], OPTOMEC® Aerosol Inkjet printer head [H], and microscope camera [C], and measure the resulting gauge dimension in order to estimate calibration errors. Calibration procedures can be employed to align the printing tool with the sample by means of optical metrology.

The OPTOMEC® Aerosol Inkjet printer was mounted on the frame 102 attached to an optical table. The width of the printed line was determined by adjusting several process parameters in its controller, such as sheath flow rate, atomizer flow rate, and atomizer current, as well as the stage motion speed of the 6-DOF positioner. The printing parameters can be characterized using a Design of Experiments approach for printing lines with 60-100 μm width.

After mounting the OPTOMEC printer nozzle, the X-Y-Z coordinates of the printer head are assumed to be constant with respect to the global origin. Before loading the substrate on the sample chuck, a reference point (the center of the sample chuck) was defined on the sample chuck to approximately identify the fiducial coordinate on the substrate when the origin of the substrate matches the center of the sample chuck closely after loading the substrate. In the kinematic calibration process, the center of the field of view (FOV) of the vertical camera in the microassembly station is defined to be the global origin [C] as this camera is fixed on the frame 102 and the origins of other stations' coordinate systems are considered unknown and will be referred to it.

To align the center of the sample chuck with the OPTOMEC® printer head, firstly, locating the coordinate of the center of the sample chuck was accomplished by only moving the 6-DOF positioner along with the long linear stage while adjusting other stages to make the center of the sample chuck reach the center of the FOV of the vertical camera in the microassembly station. The current [$X_{SC}$, $Y_{SC}$] values of the 6-DOF positioner are the coordinate of the center of the sample chuck with respect to the global origin [C]. Here, the Z height and $X_L$ movements are not considered in the coordinates.

Next, to locate the printer head's coordinate, the 6-DOF positioner was moved under the OPTOMEC® station, the Y-X-T-R stages of the 6-DOF positioner were kept at their initial position and only the Z stage moved up to keep the 4 mm distance between the substrate surface and the tip of the Aerosol Inkjet printer head. A cross pattern was printed on a glass slide loaded on the sample chuck, then the 6-DOF positioner moved under the camera and adjusted to align the center of the cross to match the center of the FOV of the camera. The current [XH, YH] values of the 6-DOF positioner are the coordinate of the Aerosol Inkjet printer head with respect to the global origin.

Figure 23:
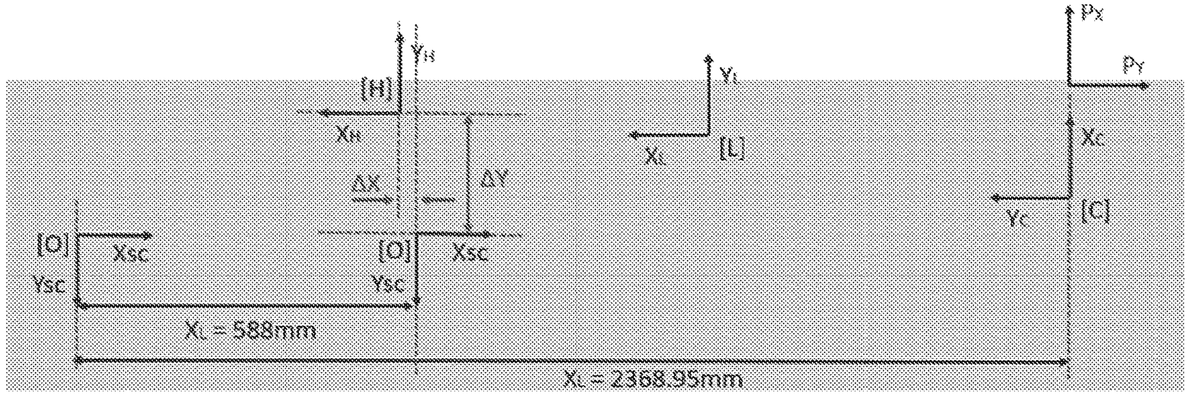
FIG. 23 shows a top view of the alignment of the center of sample chuck to the printer head.

FIG. 23 shows a top view of the alignment of the center of sample chuck to the printer head. The offsets [ΔX, ΔY] between the center of the sample chuck and the Aerosol Inkjet printer head were calculated below (as shown in FIG. 23):

$$[\Delta X/\Delta Y]=[X_H/Y_H]-[X_{SC}/Y_{SC}]=[-1.17/-7.24]$$

Based on the offsets between the center of the sample chuck and the Aerosol Inkjet printer head, they can be aligned. The traveling distance of the long linear stage for each station are constant. When the 6-DOF positioner arrives at each station with the long linear stage, the long linear stage will not move anymore, and only Y-X-Z-T-R stages above it are fine-adjusted to reach the target positions on the sample chuck.

Instead of fabricating strain gauge skin tactile sensor in the cleanroom using MEMS fabrication techniques, the system 100 was developed and kinematically calibrated for strain gauge fabrication on the flexible Kapton® substrate. Three calibration procedures were employed to align the printing tool with the samples by means of optical metrology. Inverse kinematic and visual servoing calibration techniques were applied to calibrate the OPTOMEC® Aerosol Inkjet printer nozzle with the starting point for printing the sensor on the substrate more precisely.

During the visual servoing calibration process, the precision of calibration results of the fiducial mark is around +/−1.33 μm in translation and +/−0.5 degrees in rotation. The calibration precision for the sensor printing is around 314 microns, which is less than the printing tolerance on the contact pads 650 microns.

Although specific examples and features have been described, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A system comprising: a frame defining an interior volume; an overhead robotic arm suspended from a gantry on a ceiling of the frame; a plurality of manufacturing subsystems located within the interior volume of the frame, the plurality of manufacturing subsystems configured for a plurality of additive manufacturing processes; a control system configured to perform additive manufacturing by controlling the overhead robotic arm for parts movement among the plurality of additive manufacturing processes of the manufacturing subsystems, the parts movement comprising moving an output of at least one subsystem of the plurality of additive manufacturing subsystems to another subsystem of the plurality of additive manufacturing subsystems.

2. The system of claim 1, wherein the plurality of manufacturing subsystems comprises one or more of: a microassembly station, an aerosol jetting print station, an intense pulsed light (IPL) photonic sintering station, a fiber weaving station, and a 3D printing station.

3. The system of claim 1, wherein the overhead robotic arm is a 6-degree-of-freedom (6-DOF) robotic arm.

4. The system of claim 1, comprising an additional robotic arm configured for pick and place of electronic components.

5. The system of claim 4, wherein the additional robotic arm is a 4-degree-of-freedom (4-DOF) robotic arm.

6. The system of claim 4, wherein the additional robotic arm is configured to perform pick and place of electronic components, the additional robotic arm being configured to perform the pick and place of electronic components for printed circuit board (PCB) applications and for positioning tools with respect to weaved textiles.

7. The system of claim 1, comprising a plurality of modular quick-change tools equipped with end-effectors.

8. The system of claim 7, wherein the modular quick-change tools comprise one or more of: microgrippers for micromanipulation, an ultrasonic head for bonding of metals and polymers, and vacuum nozzles or suction cups for assembling one or more components.

9. The system of claim 7, wherein the control system is configured for controlling at least one robotic arm to pick up and manipulate at least one of the modular quick-change tools.

10. The system of claim 1, wherein the gantry on the ceiling of the frame is an X-Y gantry and the control system is configured for controlling the gantry to move the overhead robotic arm.

11. The system of claim 10, wherein the X-Y gantry has a travel range of at least 2800 mm by 2250 mm.

12. The system of claim 11, wherein the frame has outer dimensions of at least 3960 mm by 3530 mm by 2215 mm (length by width by height) and the frame is configured to carry at least a 250 kg payload.

13. The system of claim 1, wherein the control system is configured for automated fabrication of perovskite photovoltaics using the overhead robotic arm.

14. The system of claim 13, wherein the control system is configured for automated fabrication of perovskite photovoltaics using inkjet printing and intense pulse light annealing.

15. The system of claim 1, wherein the control system is configured for automated fabrication of device-on-fiber microelectromechanical systems (MEMS).

16. The system of claim 1, wherein the output of the at least one subsystem of the plurality of additive manufacturing subsystems includes an output of an aerosol printing subsystem, a 3-D printing subsystem, a fiber weaving subsystem, or a microassembly subsystem.

* * * * *